US010268491B2

(12) United States Patent
Vadodaria et al.

(10) Patent No.: US 10,268,491 B2
(45) Date of Patent: *Apr. 23, 2019

(54) INTELLI-VOYAGE TRAVEL

(71) Applicant: Vishal Vadodaria, Fairfax, VA (US)

(72) Inventors: Vishal Vadodaria, Fairfax, VA (US);
Nikhil Katakam, Fairfax, VA (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/351,365

(22) Filed: Nov. 14, 2016

(65) Prior Publication Data

US 2017/0068551 A1 Mar. 9, 2017

Related U.S. Application Data

(63) Continuation-in-part of application No. 14/846,272, filed on Sep. 4, 2015, now Pat. No. 9,531,862.
(Continued)

(51) Int. Cl.
G06F 3/0482 (2013.01)
G06F 9/451 (2018.01)
(Continued)

(52) U.S. Cl.
CPC ............ G06F 9/453 (2018.02); G06F 3/0482 (2013.01); G06F 3/167 (2013.01); G06F 8/34 (2013.01);
(Continued)

(58) Field of Classification Search
CPC ........ G06F 9/4446; G06F 3/167; G06F 17/28; G06F 3/0482
See application file for complete search history.

(56) References Cited

U.S. PATENT DOCUMENTS

2002/0008716 A1* 1/2002 Colburn ................. G06T 13/40
715/706
2003/0052914 A1* 3/2003 Asami ................... G06F 3/0481
715/745

(Continued)

Primary Examiner — Tuyetlien T Tran
(74) Attorney, Agent, or Firm — Juneau & Mitchell; Todd L. Juneau

(57) ABSTRACT

A system to improve user messaging in a mobile device by providing an intelligent interactive travel as a GUI that receives verbal and text input and outputs offers to provide travel-related information, offers to provide travel-related actions, offers to send a travel-related communication, or offers to save travel-related information, wherein processing content of the user input comprises analyzing message content to collect travel-related parameters relating to geographic travel path, airport information, air travel route information, airline flight information, flight availability, flight status, flight booking information, flight cancelling information, airport fees, baggage fees, local and remote ground transportion options, local and remote weather information, message priority, channel type, channel availability, user schedule, user time zone, user time and date, user travel-related preferences, type of content, and number of recipients, and saving said collected parameters to memory, wherein the travel-related parameter is calculated using a travel-related index, the travel-related index comprising a numerical value based on travel-related hierarchy, wherein the one or more programs include instructions for providing feedback to the user wherein the feedback comprises a graphical or spoken output from the portable electronic device, said output comprising information linked to the user schedule and one or more travel-related parameters, wherein the user schedule parameter is compared to a travel-related parameter and a scheduling database is populated with an entry that uses the comparison data and, wherein specific customized travel-related profile param- (Continued)

eters are set to establish priority overrides where a user schedule has a different priority than a travel-related parameter.

12 Claims, 35 Drawing Sheets

Related U.S. Application Data

(60) Provisional application No. 62/217,879, filed on Sep. 12, 2015.

(51) Int. Cl.

| | | |
|---|---|---|
| *G06F 3/16* | (2006.01) | |
| *G06T 13/40* | (2011.01) | |
| *G10L 13/027* | (2013.01) | |
| *G10L 13/04* | (2013.01) | |
| *G10L 13/08* | (2013.01) | |
| *G06Q 50/14* | (2012.01) | |
| *G06Q 10/10* | (2012.01) | |
| *H04L 12/58* | (2006.01) | |
| *G06F 17/27* | (2006.01) | |
| *H04W 4/12* | (2009.01) | |
| *H04W 4/18* | (2009.01) | |
| *G06F 17/30* | (2006.01) | |
| *H04M 1/725* | (2006.01) | |
| *G06Q 10/02* | (2012.01) | |
| *G06Q 30/06* | (2012.01) | |
| *G06F 8/34* | (2018.01) | |
| *H04W 4/80* | (2018.01) | |

(52) U.S. Cl.
CPC ........ *G06F 17/278* (2013.01); *G06F 17/2785* (2013.01); *G06F 17/30976* (2013.01); *G06Q 10/025* (2013.01); *G06Q 10/107* (2013.01); *G06Q 10/109* (2013.01); *G06Q 30/06* (2013.01); *G06Q 50/14* (2013.01); *G06T 13/40* (2013.01); *G10L 13/027* (2013.01); *G10L 13/043* (2013.01); *G10L 13/08* (2013.01); *H04L 51/063* (2013.01); *H04L 51/26* (2013.01); *H04L 51/32* (2013.01); *H04M 1/72522* (2013.01); *H04W 4/12* (2013.01); *H04W 4/18* (2013.01); *G06T 2200/24* (2013.01); *H04M 1/72566* (2013.01); *H04M 2250/74* (2013.01); *H04W 4/80* (2018.02)

(56) References Cited

U.S. PATENT DOCUMENTS

| | | | |
|---|---|---|---|
| 2003/0128123 A1* | 7/2003 | Sumiya | G08B 23/00 340/573.1 |
| 2003/0167167 A1* | 9/2003 | Gong | G10L 15/22 704/250 |
| 2004/0030556 A1* | 2/2004 | Bennett | G06F 17/27 704/270 |
| 2004/0117189 A1* | 6/2004 | Bennett | G06F 17/27 704/270.1 |
| 2004/0260543 A1* | 12/2004 | Horowitz | G10L 15/193 704/221 |
| 2007/0074114 A1* | 3/2007 | Adjali | G06F 3/01 715/706 |
| 2008/0086696 A1* | 4/2008 | Sri Prakash | G06Q 10/00 715/757 |
| 2010/0107214 A1* | 4/2010 | Ganz | G06F 21/128 726/1 |
| 2011/0087744 A1* | 4/2011 | Deluca | G06Q 10/107 709/206 |
| 2011/0304632 A1* | 12/2011 | Evertt | G06F 3/011 345/474 |
| 2012/0330791 A1* | 12/2012 | Stevenson | G06N 3/006 705/26.61 |
| 2013/0060869 A1* | 3/2013 | Davis | G06Q 10/107 709/206 |
| 2014/0156674 A1* | 6/2014 | Alberth, Jr. | G06F 17/30312 707/748 |
| 2014/0278605 A1* | 9/2014 | Borucki | G06Q 30/0617 705/5 |
| 2015/0066479 A1* | 3/2015 | Pasupalak | G06F 17/27 704/9 |
| 2015/0301729 A1* | 10/2015 | Wang | G06F 3/0485 715/707 |

* cited by examiner

INTELLI-VOYAGE TRAVEL

CROSS REFERENCE TO RELATED APPLICATIONS

None

STATEMENT REGARDING FEDERALLY FUNDED RESEARCH

No federal government funds were used in researching or developing this invention.

NAMES OF PARTIES TO JOINT RESEARCH AGREEMENT

There are no additional parties related to this application subject to a joint research agreement

REFERENCE TO A SEQUENCE LISTING

A sequence listing is not included herein

FIELD OF THE INVENTION

The invention relates to a mobile device application having an interactive animated virtual assistant to provide travel information, and travel planning and purchasing functionality.

BACKGROUND

Software applications for mobile devices have provided users with the option of sending messages. However, messaging applications do not provide an option for obtaining detailed travel related information in a interactive manner, setting a priority, for comparing schedules, for changing the tone or manner based upon the needs of the user, for automatically correcting text, and for automatically generating and validating navigation information for events. Accordingly, there is a need for systems and methods that can actively manage the experience that a user has with an electronic message.

SUMMARY OF THE INVENTION

In one preferred embodiment, there is provided a portable electronic device having a travel-related entity and actions in communication with remote computing equipment over a communications path, comprising:
one or more input devices;
one or more output devices;
one or more processors; and
memory storing one or more programs configured to be executed by the one or more processors, the one or more programs including instructions for:
providing an Intelligent Interactive Travel Agent as a graphic animation to a user, said Intelligent Interactive Travel Agent having modules for receiving and processing verbal commands from the user; wherein the Intelligent Interactive Travel Agent operates the GUI from the verbal commands; wherein the intelligent interactive travel agent executes GUI operations comprising tapping, swiping, pinching, searching for text, entering text, and displaying retrieved content, in one or more mobile electronic display notes displayed in a container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user, said human-like animation comprises matched human-like characteristics, said characteristics comprising a human-like facial proportions, a human-like appearance, a human-like voice, and human-like gestures; and
in response to travel-related user input in a messaging application, processing content of the travel-related user input, said processing content comprising at least in part Natural Language Processing/Understanding (NLP/NLU), and providing travel-related feedback to the user:
wherein the travel-related feedback comprises a graphical or spoken output from the portable electronic device, said output programmed to represent knowledge in a Cognitive Model using Semantic Actions and Entities/Concepts and their inter-relationships,
said output programmed to express travel-related knowledge by generating English responses using Natural Language Generation (NLG), aid output programmed to maintain behavioral states and feelings in a computational manner as a result of circumstantial triggers, user behavior and productivity of Interactive Intelligent Travel Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory;
said output comprising an offer to provide travel-related information, an offer to provide travel-related actions, an offer to send a travel-related communication, or an offer to save travel-related information,
wherein processing content of the user input comprises analyzing message content to collect travel-related parameters relating to geographic travel path, airport information, air travel route information, airline flight information, flight availability, flight status, flight booking information, flight cancelling information, airport fees, baggage fees, local and remote ground transportation options, local and remote weather information, message priority, channel type, channel availability, user schedule, user time zone, user time and date, user travel-related preferences, type of content, and number of recipients, and saving said collected parameters to memory;
wherein the travel-related parameter is calculated using a travel-related index, the travel-related index comprising a numerical value based on travel-related hierarchy
wherein the one or more programs include instructions for providing feedback to the user wherein the feedback comprises a graphical or spoken output from the portable electronic device, said output comprising information linked to the user schedule and one or more travel-related parameters,
wherein the user schedule parameter is compared to a travel-related parameter and a scheduling database is populated with an entry that uses the comparison data; and, wherein specific customized travel-related profile parameters are set to establish priority overrides where a user schedule has a different priority than a travel-related parameter.

In another preferred embodiment, there is provided wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory.

In another preferred embodiment, there is provided wherein the one or more programs include instructions for providing feedback to the user wherein the feedback comprises a graphical or spoken output from the portable electronic device, said output comprising a series of selectable options for modifying the initial user input.

In another preferred embodiment, there is provided wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service In another preferred embodiment, there is provided wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

In another preferred embodiment, there is provided wherein the one or more programs include instructions for providing feedback to the user wherein the feedback comprises a graphical or spoken output from the portable electronic device, said output comprising an automated re-transcription of content with said user input based on said relationship hierarchy.

In another preferred embodiment, there is provided a method of providing a contextual linking application having an animated interactive intelligent travel agent for managing communications with contacts in a portable mobile electronic device, comprising the steps:

in a mobile electronic device having one or more processors, and memory storing one or more programs configured to be executed by the one or more processors, executing one or more programs including instructions for providing an Intelligent Interactive Travel Agent as a graphic animation to a user, said Intelligent Interactive Travel Agent having modules for receiving and processing travel-related verbal commands from the user; wherein the Intelligent Interactive Travel Agent operates the GUI from the travel-related verbal commands; wherein the intelligent interactive travel agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the travel-related verbal commands from the user, said human-like animation comprises matched human-like characteristics, said characteristics comprising a human-like facial proportions, a human-like appearance, a human-like voice, and human-like gestures; and in response to travel-related user input in a messaging application, processing content of the user input, said processing content comprising at least in part Natural Language Processing/Understanding (NLP/NLU), and providing travel-related feedback to the user;

wherein the travel-related feedback comprises a graphical or spoken output from the portable electronic device, said output programmed to represent knowledge in a Cognitive Model using Semantic Actions and Entities/Concepts and their inter-relationships, said output programmed to express knowledge by generating English responses using Natural Language Generation (NLG), aid output programmed to maintain behavioral states and feelings in a computational manner as a result of circumstantial triggers, user behavior and productivity of Interactive Intelligent Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory; said output comprising an offer to provide travel-related information, an offer to provide travel-related actions, an offer to send a travel-related communication, or an offer to save travel-related information;

processing travel-related parameters relating to geographic travel path, airport information, air travel route information, airline flight information, flight availability, flight status, flight booking information, flight cancelling information, airport fees, baggage fees, local and remote ground transportion options, local and remote weather information, message priority, channel type, channel availability, user schedule, user time zone, user time and date, user travel-related preferences, type of content, and number of recipients, and saving said collected parameters to memory;

wherein the travel-related parameter is calculated using a travel-related index, the travel-related index comprising a numerical value based on travel-related hierarchy;

wherein the one or more programs include instructions for providing feedback to the user wherein the feedback comprises a graphical or spoken output from the portable electronic device, said output comprising information linked to the user schedule and one or more travel-related parameters, wherein the user schedule parameter is compared to a travel-related parameter and a scheduling database is populated with an entry that uses the comparison data; and, wherein specific customized travel-related profile parameters are set to establish priority overrides where a user schedule has a different priority than a travel-related parameter.

wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory.

In another preferred embodiment, there is provided a method wherein the one or more programs include instructions for providing feedback to the user wherein the feedback comprises a graphical or spoken output from the portable electronic device, said output comprising a series of selectable options for modifying the initial user input.

In another preferred embodiment, there is provided a method wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service.

In another preferred embodiment, there is provided a method wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

In another preferred embodiment, there is provided a method wherein the one or more programs include instructions for providing feedback to the user wherein the feedback comprises a graphical or spoken output from the portable electronic device, said output comprising an automated re-transcription of content with said user input based on said relationship hierarchy.

In another preferred embodiment, there is provided a non-transitory computer-readable storage medium comprising instructions that, when executed by a processor, cause the processor to:

provide providing an Intelligent Interactive Travel Agent as a graphic animation to a user, said Intelligent Interactive Travel Agent having modules for receiving and processing verbal commands from the user; wherein the Intelligent Interactive Travel Agent operates the GUI from the verbal commands; wherein the intelligent interactive travel agent executes GUI operations comprising tapping, swiping, pinching, searching for text, entering text, and displaying retrieved content, in one or more mobile electronic display notes displayed in a container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user, said human-like animation comprises matched human-like characteristics, said characteristics comprising a human-like facial proportions, a human-like appearance, a human-like voice, and human-like gestures; and in response to travel-related user input in a messaging application, processing content of the travel-related user input, said processing content comprising at least in part Natural Language Processing/Understanding (NLP/NLU), and providing travel-related feedback to the user:

wherein the travel-related feedback comprises a graphical or spoken output from the portable electronic device, said output programmed to represent knowledge in a Cognitive Model using Semantic Actions and Entities/Concepts and their inter-relationships, said output programmed to express travel-related knowledge by generating English responses using Natural Language Generation (NLG), aid output programmed to maintain behavioral states and feelings in a computational manner as a result of circumstantial triggers, user behavior and productivity of Interactive Intelligent Travel Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory;

said output comprising an offer to provide travel-related information, an offer to provide travel-related actions, an offer to send a travel-related communication, or an offer to save travel-related information, wherein processing content of the user input comprises analyzing message content to collect travel-related parameters relating to geographic travel path, airport information, air travel route information, airline flight information, flight availability, flight status, flight booking information, flight cancelling information, airport fees, baggage fees, local and remote ground transportion options, local and remote weather information, message priority, channel type, channel availability, user schedule, user time zone, user time and date, user travel-related preferences, type of content, and number of recipients, and saving said collected parameters to memory;

wherein the travel-related parameter is calculated using a travel-related index, the travel-related index comprising a numerical value based on travel-related hierarchy wherein the one or more programs include instructions for providing feedback to the user wherein the feedback comprises a graphical or spoken output from the portable electronic device, said output comprising information linked to the user schedule and one or more travel-related parameters, wherein the user schedule parameter is compared to a travel-related parameter and a scheduling database is populated with an entry that uses the comparison data; and, wherein specific customized travel-related profile parameters are set to establish priority overrides where a user schedule has a different priority than a travel-related parameter.

DESCRIPTION

Definitions

Mobile Devices

Figure 1:
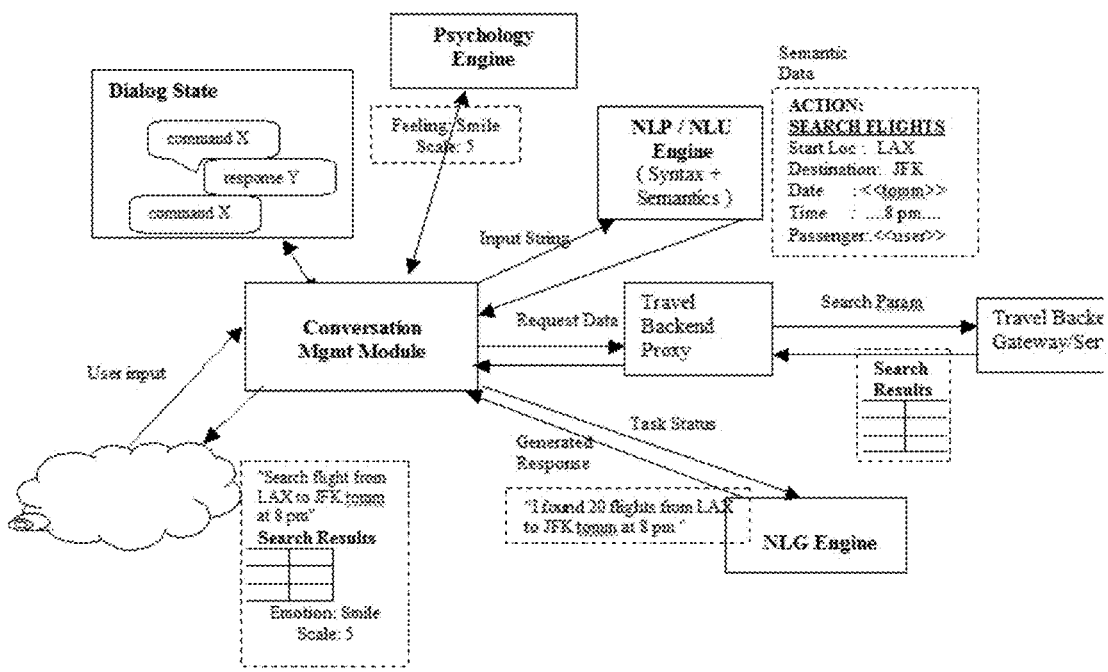
FIG. 1 is a functional block diagram of an architectural overview of one aspect of the invention showing computational flow.

Embodiments of the present invention make use of a mobile communication device. As contemplated herein a mobile device is a two-way communication device with advanced data communication capabilities having the capability to communicate in a wireless or wired fashion with other computing devices. As adequately described in U.S. Pat. No. 7,912,480, mobile devices include the capability for voice communications and data messaging, as well as capabilities as wireless Internet appliances. Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Communications Networks

Data and voice communications are performed through a communication subsystem that receives messages from and sends messages to a wireless network. The communication subsystem can be configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), Intelligent Digital Enhanced Network (iDEN™), 4G, LTE, LTE Advanced, and 5G standards.

Mobile Device Hardware and Subsystems

The main processor interacts with subsystems such as Random Access Memory (RAM), flash memory, display, auxiliary input/output (I/O) subsystem, data port, keyboard, speaker, microphone, short-range communications.

Some of the subsystems perform communication-related functions, whereas other subsystems provide "resident" or on-device functions. By way of example, the display and the keyboard can be used for both communication-related functions, such as entering a text message for transmission over the network, and device-resident functions such as a calculator or task list.

Operating system software used by the main processor is typically stored in a persistent store such as the flash memory, which can alternatively be a read-only memory (ROM) or similar storage element. Those skilled in the art will appreciate that the operating system, specific device applications, or parts thereof, can be temporarily loaded into a volatile store such as the RAM.

Mobile devices send and receive communication signals over wireless networks after network registration or activation procedures are completed.

The main processor, in addition to its operating system functions, enables execution of software applications on the mobile device. The subset of software applications that control basic device operations, including data and voice communication applications, will normally be installed on the mobile device during its manufacture. The programs can include an email program, a web browser, an attachment viewer, and the like.

Mobile devices also include a device state module, an address book, a Personal Information Manager (PIM), and other modules. The device state module can provide persistence, i.e. the device state module ensures that important device data is stored in persistent memory, such as the flash memory, so that the data is not lost when the mobile device is turned off or loses power. The address book can provide information for a list of contacts for the user. For a given contact in the address book, the information can include the name, phone number, work address and email address of the contact, among other information. The PIM has functionality for organizing and managing data items of interest to a subscriber, such as, but not limited to, e-mail, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device with respect to such items. This can be particularly advantageous when the host computer system is the mobile device subscriber's office computer system.

Additional applications can also be loaded onto the mobile device through at least one of the wireless network, the auxiliary I/O subsystem, the data port, or the short-range communications subsystem. This flexibility in application installation increases the functionality of the mobile device and can provide enhanced on-device functions, communication-related functions, or both. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices.

Generally, a received signal such as a text message, an e-mail message, or web page download will be processed by the communication subsystem and input to the main processor. The main processor will then process the received signal for output to the display or alternatively to the auxiliary I/O subsystem. A subscriber can also compose data items, such as e-mail messages, for example, using the keyboard in conjunction with the display and possibly the auxiliary I/O subsystem. The auxiliary subsystem can include devices such as: a touch screen, mouse, track ball, infrared fingerprint detector, or a roller wheel with dynamic button pressing capability. A composed message can be transmitted over the wireless network through the communication subsystem.

For voice communications, the overall operation of the mobile device is substantially similar, except that the received signals are output to the speaker, and signals for transmission are generated by the microphone. Alternative voice or audio I/O subsystems, such as a voice message recording subsystem, can also be implemented on the mobile device. Although voice or audio signal output is accomplished primarily through the speaker, the display can also be used to provide additional information such as the identity of a calling party, duration of a voice call, or other voice call related information.

Communication subsystems comprise a receiver and a transmitter, one or more embedded or internal antennas, Local Oscillators, and a communications processor for wireless communication. The communications processor can be a Digital Signal Processor (DSP).

Non-transitory computer-readable storage media includes any physical form capable of storing and providing access to computer instructions that, when executed by a computer processor, cause the processor to perform the functions described in the steps provided herein. Media may include without limitation a hard drive, solid state drive, flash memory, and ROM memory.

Processor comprises electronic processing circuitry or control circuitry that operates to control the operations and performance of the electronic device and the application thereon.

Input interfaces comprise inputs to electronic circuitry comprising one or more tactile inputs, microphone inputs, camera input. Outputs comprise one or more display outputs, speaker outputs, and tactile/haptic outputs. Inputs and outputs may connect by wire or wirelessly and include appropriate hardware, firmware and software for successful connection. An example of mobile electronic devices contemplated for use in the present invention include without limitation by way of example an Apple iPhone 3-4-5-6, Apple iPads, Apple Minis, Samsung Galaxy series smartphones and tablets, as well as similar Windows operated devices, and other Android operated devices.

Signals and Networks

Signals received by the antenna through the wireless network are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor. In a similar manner, signals to be transmitted are processed, including modulation and encoding, by the communications processor. These processed signals are input to the transmitter for digital-to-analog (D/A) conversion, frequency up conversion, filtering, amplification and transmission over the wireless network via the antenna.

The wireless link between the mobile device and the wireless network can contain one or more different channels, typically different RF channels, and associated protocols used between the mobile device and the wireless network. An RF channel is a limited resource that must be conserved, typically due to limits in overall bandwidth and limited battery power of the mobile device.

Messages intended for a user of mobile device are initially received by a message server of LAN. Such messages may originate from any of a number of sources, including from a computer within LAN, from a different mobile device connected to wireless network, directly from a different computing device.

Message servers typically act as the primary interface for the exchange of messages, particularly e-mail messages, within an organization and over the shared network infrastructure. Each user in the organization that has been set up to send and receive messages is typically associated with a user account managed by a message server.

Message servers may: monitor the user's "mailbox" for new e-mail messages; apply user-definable filters to new messages to determine if and how the messages will be relayed to the user's mobile device; push messages to a mobile device, receive messages composed on mobile device, re-format the composed messages, and re-route the composed messages for delivery.

Mobile Server

The wireless support components may also include a mobile note server that, in a similar manner to that of the message management server, facilitates the handling of electronic messages. For example, mobile note server may: provide a storage area for a user's electronic messages; monitor for new or edited messages; communicate with other devices when a messages is edited; communicate with other servers; and the like.

Embodiments include a system for electronic messages in a mobile environment. This system includes a mobile messages controller, which controls the operation of the system and coordinates the various functional blocks within the system. The mobile messages controller is connected to, and interacts with, a messages database, an input module, an output module, a display/notification module, a location module, and a time module.

The system allows a user to enter electronic messages into the messages database via the input module and the mobile messages controller. When entering a new electronic message or editing an electronic message, the user (the person inputting the electronic message) is given the option of entering information, for example, in various fields, including, for example, a location and a time. This information allows the person inputting the electronic message to better define when the electronic message should be made active and/or when a user is to be notified.

NLP: Natural Language Processing

Natural language processing (NLP) refers to the computer understanding, analysis, manipulation, and/or generation of natural language. NLP is a subfield of artificial intelligence and linguistics. It studies the problems of automated generation and understanding of natural human languages. Natural language generation systems convert information from computer databases into normal-sounding human language, and natural language understanding systems convert samples of human language into more formal representations that are easier for computer programs to manipulate.

Processing natural language for numerous applications is generally well known. Recent interest in processing has been due in large part by computer applications such as language translation, grammatical correction of sentences as part of word processing systems, and the like. For example, Machine Translation Technology: On the Way to Market Introduction, Siemens Review, Vol. 54, No. 6 November/December (1987) describe research into machine translation of text in several languages. Also, the use of language parsing in processing natural language is well known. Many parsing techniques have been described, see for example, J. J. Robinson, Diagrams: A Grammar for Dialogues, Communication of the Association for Computing Machinery, Vol. 25, No. 1, January 1982, pp. 27-47, which discloses an interactive filter procedure, a grammar core, a weakening factor, a probability factor and a threshold mechanism; and K. Vehara, et al., Steps Toward an Actor-Oriented Integrated Parser, Proceeding of the International Conference of Fifth Generation of Computer Systems 1984, Tokyo, Japan, Nov. 6-9, 1984 (ICOT, North Holland).

Methods of grammatically processing a sentence using parsers are described in: Allen, James; Natural Language Understanding. (The Benjamin/Cummings Publishing Company Inc., Menlo Park, U.S.A. 1987.)

The parsers there described operate according to an algorithm based on a rewriting mechanism. This mechanism requires that the parsers carry out parsing by reference to a large number of rewriting rules. These rewriting rules make a connection between a group of words and/or sentence constituents, on the one hand, and a parent constituent, i.e. a constituent dominating this group, on the other hand.

The number of rewriting rules depends on the extent of the description mechanism to be used and forming the basis of the parser.

As defined herein, feedback that comprises a graphical or spoken output from the portable electronic device is performed by an intelligent agent displayed by means of an Animated 3D Personal Virtual Assistant with Facial Expressions, hand gestures and body movements in a Human like appearance. This is not an abstract intelligent agent functionality but it is personified by means of an intelligent agent displayed by means of an Animated 3D Personal Virtual Assistant with Facial Expressions, hand gestures and body movements in a Human like appearance and includes these features:

1. programmed to process/understand language using NLP/NLU (Natural language processing/understanding) Features
2. programmed to represent knowledge in a Cognitive Model using Semantic Actions and Entities/Concepts and their inter-relationships and
3. programmed to express its knowledge by generating English responses using NLG (Natural Language Generation) features
4. programmed to maintain behavioral states and feelings in a computational manner as a result of circumstantial triggers, user's behavior and Agent's own productivity by means of a Psychology Engine and express the same using facial Expressions rendered in a 3D Avatar
5. programmed to have Conversations/Dialogs in a taking-turns, i.e. dialogue, manner while remembering the context of the conversation in a Contextual Memory, as compared to just answering a question asked by the user and then forgetting it.

Server Side Architecture

Mentioned below is the Technical Architecture of the intelli-Voyage Travel Application which uses the Artificial Intelligence Engine called Intelli-Agent as its underlying and enabling mechanism.

The intelli-Voyage application embodies an intelligent agent displayed graphically on the screen by means of a Animated 3D Personal Virtual Assistant with Facial Expressions, hand gestures and body movements in a Human like appearance that is capable of understanding the Travel domain Entities/Concepts (e.g. flights, airlines, airports, fares/prices, currencies, travel date, travel time, stopover time, Seat, Services available in the flight etc) and various Semantic Actions e.g. Searching flights, booking a flight, checking the status flight, selecting the seat etc)

The intelli-Voyage application accepts a text input and generates a Travel related Meaning Representation Structure in the form of Travel related Concepts/Entities and Travel related Actions as described above.

If the input text contains a Travel related Command from the user, it performs the requested Travel Operation by gathering all the required Search Criteria parameters using a multi step Conversation Management module and then obtains the results accordingly and displays it to the user in a multi modal user interface showing Travel Data in a GUI. The core module responsible for the Language Processing and Understanding tasks are carried out by the NLP Engine Component of the Intelli-Agent Framework. Furthermore the Agent Framework maintains its mental states and behavioral states in the Psychology Engine and updates them while interacting with the users to perform the requested operations.

Consider a user entering an input text (by means of a spoken command or by typing into an input device) and instructing the Intelligent Agent to schedule a meeting e.g. "set up a meeting with Tom at Starbucks tomm at 8 pm for 1 hour".

The sequence of steps that follows is explained in FIG. 1.

FIG. 1: Intelli-Voyage+Intelli-Agent Artificial Intelligence Engine (Technical Architecture)

The process is explained in each step as follows

The user enters the input string by means of a spoken command or by typing via a keyboard into an input device. The user can simply speak the input sentence in the form of a voice command on a client device which then converts the voice input to text by means of a Automatic Speech Recognition (ASR) module or the user can simply type in the input text through the a keyboard (onscreen/externally attached).

The server receives the user input and sends it to the Conversation Management module.

Conversation Management Module

The Conversation Management Module stores the User Session (e.g. the multi step on-going conversation between the user and the intelligent agent with regards to a operation requested by the user e.g. searching flights, checking flight status, booking/canceling a flight, checking weather etc)

The Conversation Management can start a new session as soon as it senses a command input from the user e.g. if the user says "I want you to search flights for me". This input by itself is not complete. (because there are certain basic parameters needed e.g. start location, destination location, a travel date/time etc and optionally a return date etc)

This will trigger a user dialog session to be initiated by the Conversation Management Module which include a step by step procedure to ask questions for the unspecified parameters. (the user can input multiple unspecified parameters in 1 turn).

However if the user specifies a command with all the required parameters in 1 line.

"search flights from LAX to JFK tomorrow at 8 pm", then the dialog management module doesn't maintain a session and considers it a spot request with all the sufficient parameters to perform the requested operation.

Natural Language Processing/Understanding Engine (NLP/NLU Engine)

The NLP/NLU Engine (Natural Language Processing Engine) is component that does the Natural language processing by following a Multi pass process. (as described below)

The NLP/NLU Engine analyzes the user input in its multiple passes (pass 1, pass 2, pass 2.5, pass 3, pass 3.5, pass 4, pass 4.5, pass 5, Semantic Analysis) to determine the Syntactic Tree Structure and the Semantic Analysis (i.e. the Semantic Action and its parameters) corresponding to the user input.

The Data identified by the NLP/NLU Engine is then transferred to the Conversation Management module which compares the status of the task to the user input and determines the new status of the task. For example, if the Conversation Management module is currently expecting a Airport Location from the user and the user specifies a valid Airport (e.g. London Heathrow international airport), then it could be determined that the user has specified the Airport Location. Therefore, the step to retrieve the Airport Location is rendered complete.

Travel Backend Proxy Module, Travel Backend Gateway/Service

Upon receiving the Semantic Action (e.g. TRAVEL, (SEARCH/BOOK/CANCEL) FLIGHT etc) and all the Parameters (either by means of a single sentence command or by means of a dialog involving multiple request/response cycles) the search criteria is sent to the Travel Backend Proxy The Travel Backend Proxy receives the Travel related Action and it's parameters and converts to a form understandable by the Travel Backend Gateway.

The Travel Backend gateway receives the data and gives out the results for the query.

e.g. If the user wanted to Search flights from A to B on Date D at Time T, then the travel gateway responds back with the Flight Results Data including various legs of the itinerary, total cost, date and time etc).

This Backend Results data is then received back by the Backend Module which then converts it to the form understandable by the client and sends back to the Conversation Management module.

Natural Language Generation Engine (NLG Engine)

The Conversation Management module delegates the Natural language generation responsibility (i.e. generating a simple English sentence as a response) to Natural Language Generation (NLG) Engine. The NLG engine determines the kind of response that needs to be sent back to the user such as ("I am sorry, I could not search flights from LAX to JFK tomorrow at around 8 pm" or "I found 20 flights from LAX to JFK tomorrow at around 8 pm")

The NLG engine identifies the sentence template based on the purpose of the message as well as the details of the response e.g. subject, verb, objects to be used for the sentence and generates a fully constructed sentence as a response. The generated response sentence is sent back to the Conversation Management module.

Psychology Engine Changes in Behavioral State and expressing Feelings)

The behavioral states of the intelligent Agent get updated in the Psychology Engine. Also the Agent expresses its feelings by means of behavior states reflected as facial expressions using dynamically controlled 3D Animation.
  a. Depending on the meaning of the user input e.g. intended operation, user preference, user behavioral states, user demands and requirements etc, (e.g. If the user responds with a time sensitive request in a angry tone indicating urgency, the intelligent Agent might get nervous or concerned and the mood i.e. behavioral state gets affected.)

b. Depending on the performance of the Intelligent Agent as compared to bare minimum results expected. (e.g. if the user wants the agent to search flights and the agent is not able to find any flights because the backend gateway is unavailable or slow, or if the flights meeting the selection criteria are not available, then its very embarrassing for the Agent. i.e. behavioral state gets affected.)

Results Consolidation

Conversation Management module packages the following and sends it to the server
1. Natural Language Generation response i.e. generated response in plain English form understandable by the user
2. Operation Status/Search results from the Travel Backend Gateway/Service.
3. Feelings Response: The behavioral state and the intensity/extent of such a state (e.g. if the behavior is anger and the intensity is 5 on a scale of 1 to 5, then it means the agent is extremely angry).

Rendering the Results on the Client Device

The server then responds to the client device with Search results/Status and the response sentence along with behavioral state/intensity.

On the client device, the following things are displayed
1. The generated response as a English sentence is displayed in the chat window in a chronological manner.
2. The Operation/results are shown in a tabular display.
3. The behavioral state (confusion, anger, surprise, happiness, fear, embarrassment) along with its intensity (scale of 1 to 5) are rendered on the face of the Intelligent Agent as a Facial Expression on a 3D Mesh. The intensity of the behavioral state gets programmatically modified based on the intensity value by dynamically i.e. programmatically adjusting the vertices on face (3D mesh) of the intelligent agent using morphing techniques.

The users sees the output and speaks the next input sentence and the conversation continues.

Natural Language Processing (NLP)/Natural Language Understanding (NLU)

NLP/NLU Engine component contains a Syntactic Parser and a Semantic Analyzer.

The figure below shows the underlying mechanism of the Syntactic Parser.

Syntactic Parser (Multi Pass Dependency)

Figure 2:
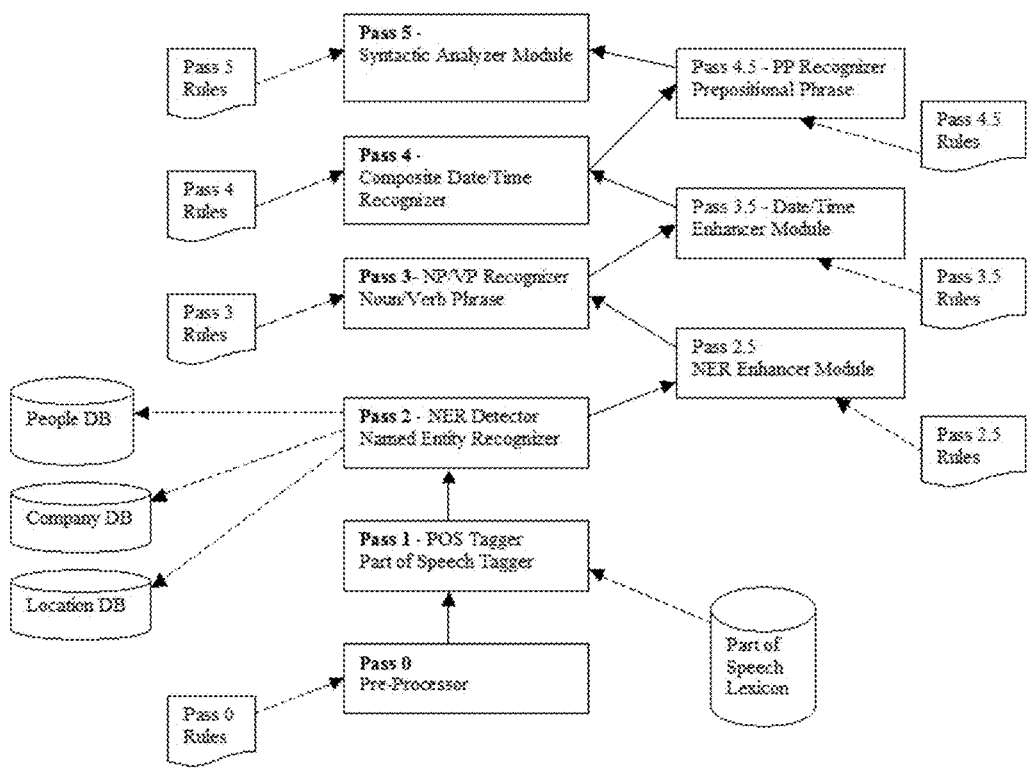
FIG. 2 is a functional block diagram of an architectural overview of another aspect of the invention showing computational flow.
Figure 3:
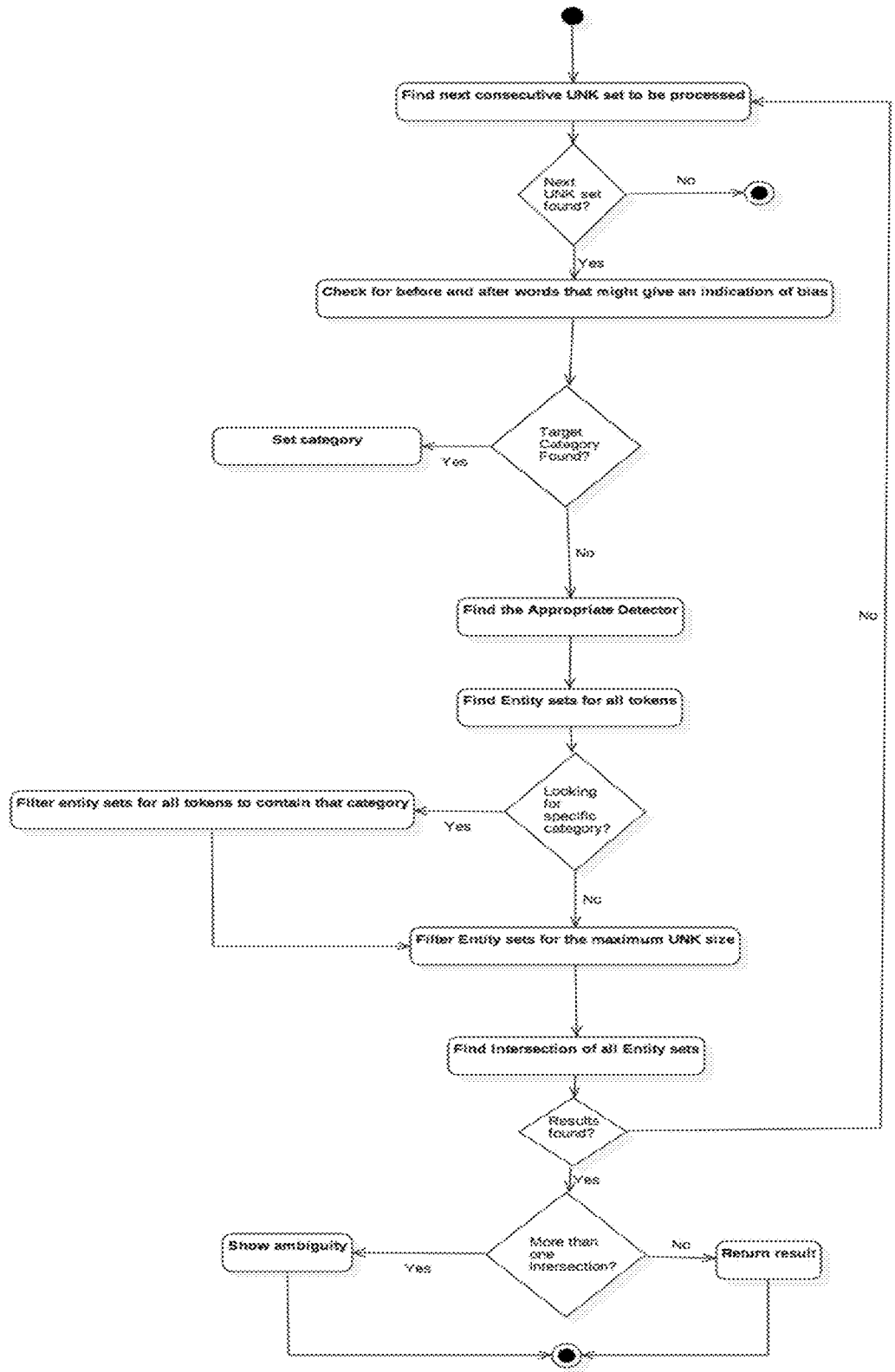
FIG. 3 is a functional block diagram of an architectural overview of another aspect of the invention showing computational flow.

Referring now to FIG. 2.

Multi pass processing—Syntactic Parser

The input string is processed by the Syntactic parser by a series of passes
1. Pass 0/Pre-processor: The input string passes through the preprocessor. This is the pass where number detection happens. This happens even before Parts of Speech is identified so that the future passes are ready to handle a relatively consolidated and standardized input data instead of dealing with raw data. e.g. is the input contains "three hundred and forty nine dollars blah blah", the preprocessor converts it to " . . . 349 dollars . . . blah blah"

The Pass1 is where the POSTagger (i.e. Part of Speech Tagger) starts converting each input word/token into its corresponding Part of Speech. The recognized words are assigned a part of speech type (POSType i.e. a Part of Speech Types such as NN for common noun, NNP for proper noun, VB for verbs, JJ for adjective as per the NLP standard naming conventions) where as the unrecognizable words such as proper noun tokens (e.g. name of people, cities etc) are considered to be unknowns (UNKs). The assignment of POSTypes to every token is therefore completed at the end of this pass.

Pass2 is Named Entity Recognition (NER), where Named Entities (i.e. proper nouns) that represent Companies, Locations (state, country, city, airport, hotels etc.), Person names (e.g. Jack, Joe, Mr. Smith) and Brand names related to things (e.g. Samsung, Sony etc) are identified Pass2.5 is where the NER is enhanced to produce better results. This pass uses common sense logic for Composite Named entities (e.g. Hilton Chicago is composed of two tokens i. "Hilton" which is a COMPANY (i.e. chain of hotels) and ii. "Chicago" which is interpreted at Pass 2 as a CITY (located in State of Illinois). But together "Hilton Chicago" represents a HOTEL located in Chicago, Ill. and that is owned/franchised by the "Hilton Group of Hotels" and has a specific address. In the same way Airport names consist of Person Names and City names. e.g. Baltimore Washington Thurgood Marshall represents BWI Airport but the tokens inside mean something different (e.g. Baltimore is a city, Thurgood Marshall is a person name, Washington is a Metropolitan Area.)

Pass 3 and Pass 3.5 are used to identify Noun Phrases (NP). To elaborate, this is where specific phrases for expressions such as units of measurement (this includes currency ("Canadian dollars"=>CAD), length, speed, distance etc.,) along with simple expressions of date (e.g. "30 December this year"=>Dec. 30, 2015) and time ("10 in the morning"=>10 a.m.) are recognized.

Pass 4 has the ability to deal with extremely Complex expressions of Date and Time. A classic example for this would be "at 10 on the 2nd Sunday of January during the morning hours". This is a Composite Date/Time objects represents a specific date/time combination. These kinds of complex expressions are dealt with in Pass 4

Pass 4.5 works on the identification of Prepositional Phrase (PP). This means that phrases that contain information regarding the sentence are identified. For instance, a Prepositional Phrase would be such as "from New York City" which gives an indication that New York City is a Location mentioned and "from" is the preposition that would give an indication of what kind of role the location is playing e.g. Source or Destination. Sometimes the prepositional phrase is included as a part of post modifier (e.g. "departing from LAX on 5 December" vs "arriving at JFK on 5 December" can mean completely different things as far as the dates are concerned although the preposition used before the date is the same i.e. on). Hence the context of the region of the syntactic tree in which the prepositional phrase is located is critical to identifying the meaning.

Pass5 is where the Syntactic Analysis happens. The sentence as a whole is broken down and a tree is constructed with Verb Phrases (VP) at the top followed by Verbs (NP) and Noun Phrases (NP) and Prepositional Phrases (PP) as the next level nodes that provide further information about the subject, verb and object of the input sentence. This is done by a set of syntactic rules established depending on the Syntactic Frame of the Sentence.

The final phase is the semantic conversion where the Syntactic tree is then examined further to identify the Semantic Actions (e.g. TRAVEL, SEARCH, NAVIGATE, BOOK, CANCEL, CHECK_STATUS) pertaining to the core meaning/purpose of the input sentence and further identifying the parameters or attributes that are required to perform the Semantic Action e.g. TRAVEL is a Semantic Action representing a Travel itinerary. Typically Travel itineraries are for a Beneficiary i.e. user along with one or more co-traveler(s) from a START LOCATION to a DESTINATON LOCATION on a certain DATE at a certain TIME. So these parameters becomes the fields in the Semantic Action.

Feature #1. Resolving Ambiguities for Named Entity Recognition of Travel Entities Identifying the Proper Nouns and their Types The objective of this process known as Named Entity Recognition (NER) is to identify if a Travel related proper nouns (e.g. Airport name, City name, Country name, Hotel name, passenger name, Car Brand etc) exists in the user input sentence and identify the Concept/Entity Type of Proper Noun (e.g. PERSON, CITY, STATE, COUNTRY, AIRPORT, HOTEL etc), assign the correct Part of Speech Type (POSType) and find out additional information regarding the "Named Entity" so it could be used for further processing. This process uses a cluster based NER algorithm that segregates and unifies the different persons, locations, organizations and other proper nouns mentioned in the user input.

The NER Component has proper nouns stored in the NER Database (including Airport Names, City Names, Country Names, Person Names etc). When the user mentions a proper noun, the information is looked up based on an algorithm to retrieve the exact Named Entity the user has mentioned.

However, it is not always that the user is required to mention the type of entity. For example, a user can say "Los Angeles International" as opposed to "Los Angeles International airport" where the user has specifically mentioned an airport.

In the event that a user mentions a specific type of named entity like an AIRPORT or a PERSON, the algorithm has the ability to do a biased search so as to reduce performance overhead. The noun type (NN) for the word before or after the named entity indicates the type of biased search. For certain entries, there exists a mandatory common noun indicator for certain entries without which the named entity would be ambiguous or of no meaning.

Example

"I would like to go to Collins booksellers"

In this case, there is a mandatory common noun indicator "booksellers" that indicates that the named entity mentioned in the sentence is actually a book store. Without the word "booksellers", the sentence would be "I would like to go to Collins". This can be the name of a person, a bookstore, or even a restaurant.

In such event, the user would be asked a follow up question as to what "Collins" means (bookstore, restaurant, person etc.,)

A biased search when the user mentions the type of named entity would increase the performance of the algorithm as an ambiguity is less likely to occur because of the specific category being searched for The diagram shows the algorithm for UNK parsing.

Steps of Algorithm

The first step in the algorithm is the identification of consecutive Unknowns (UNKs) to be processed. This set of UNKs, also known as the UNK Island is first identified by iterating through the POSType array of the sentence.

The next step is to identify the number of UNKs and also the set of UNKs to be processed.

Example: "Get me flights to Baltimore Washington Thurgood Marshall international Airport."

After the POSType identification from Pass 1 happens, the POSType sequence looks as follows.

Figure 4:
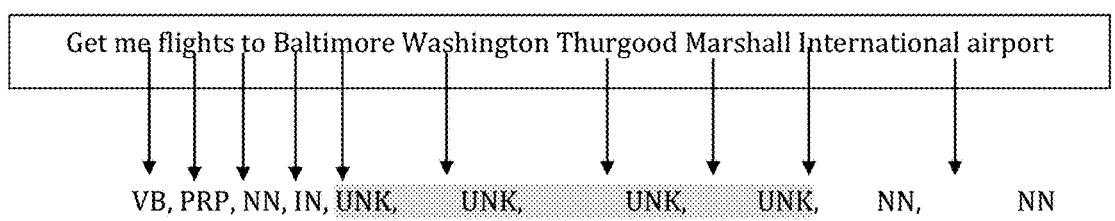
FIG. 4 is a diagram showing unknowns.

Referring now to FIG. 4.

PRP→Pronoun UNK Island

VB→Verb

The island of UNKs is processed as follows:
1. The highlighted region is the island of UNKs whose types need to be detected by either all or some of the UNKs occurring consecutively.

All 4 UNKs are identified next to the first UNK and then all the UNKs are sent out for parsing. If there is a perfect match for all UNKs, then the process is suspended. However, if a match is not found, the number of UNKs to be sent for processing is reduced by 1 (which becomes 3) in this case and is sent for processing as shown in the figure above.

If still no match is found, the other set of UNKs that can be formed by the 2nd, 3rd and 4th UNKs are considered and sent for processing.

All he subsets of UNK Island number are identified and the sequences of UNKs and the processing continues till all the UNKs are identified.

The example above has all different POSTypes but an island of UNKs which is "Baltimore Washington Thurgood Marshall" needs to be considered for UNK processing. Firstly, the island of (Baltimore, Washington, Thurgood, Marshall) comprises of 4 UNKs which are first identified along with the before and after words of the UNK island Consider the 4 UNKs as UNK1, UNK2, UNK3 and UNK4.

The set of UNKs to be processed for every iteration, are considered as follows

UNK1,UNK2,UNK3,UNK4
UNK1,UNK2,UNK3, UNK4
UNK1, UNK2,UNK3,UNK4
UNK1,UNK2, UNK3, UNK4
UNK1, UNK2,UNK3, UNK4
UNK1, UNK2, UNK3,UNK4
UNK1, UNK2, UNK3, UNK4
UNK1, UNK2, UNK3, UNK4
UNK1, UNK2, UNK3, UNK4
UNK1, UNK2, UNK3, UNK4

The algorithm is self explanatory as the set of UNKs are considered 4 at a time, then 3, then 2 and lastly 1 at a time. If at any point, a perfect match is found, then the processing stops and the obtained value are used in further passes.

The number of UNKs is also an important case when finding out the proper noun as the identification of the total number of words would give an indication of what kind of words to look for.

For instance, if "Baltimore Ravens" is mentioned in the sentence, it does not make sense to look at proper nouns that are one word long. Therefore, the word "Baltimore Ravens" would never be considered in the case of a one word UNK. But Baltimore (city) is a single token word. If "Baltimore Ravens" proper noun never existed, then Baltimore would be considered as a city and Ravens as a plural of a bird.

This step is where the tree and the keywords mentioned in the user input looked up in the hashmap of the proper nouns available to the agent. The named entities that likely match the expression mentioned in the UNK Island are identified.

In this case, Baltimore indicates a city and would also find Baltimore Ravens in the possible set of named entities.

When the token Ravens is also looked up in the hashmap, Baltimore Ravens is a possible named entity. When the intersection of both the sets of named entities is computed, Baltimore Ravens, which is the desired entity, is identified correctly.

However, there are possibilities of other ambiguous entities which might be in the intersection of hashMap lookups. These ambiguities are filtered by the category and the number of tokens considered for lookup in the algorithm.

Example

Figure 5:
FIG. 5 is an illustrative representation of mobile device screen shot.

If the user mentions Los Angeles International airport and Los Angeles
international is a company, (Los, Angeles) are UNKs. If Los Angeles international is a company, then the lookup has been done for only the UNK Island. However, the airport token (also known as concept indicator) identifies the category of lookup and the ambiguity is resolved Referring now to FIG. 5.

Here is a screen shot of how this looks like.

This is explained in the examples below.

Example 1

The user can mention "Baltimore Washington Thurgood Marshall airport" in his input.

Since the user has already mentioned that it is an airport, it is going to be considered an airport.

If the user has mentioned "Mr. Thurgood Marshall" instead, then it would be identified as a person of name Thurgood Marshall.

Or if the user says "Baltimore Washington Thurgood Marshall"

Since this is the full name of an airport, this will be identified as so.

An Alternative to this would be that the user mentions only the code.

If the user says BWI, which is the code for Baltimore Washington Thurgood Marshall airport, then it will be identified as the code of the airport and the necessary information is extracted.

Example 2

Even the order being changed would not really cause any problems for the detection.

For example, if the user says Washington George for a person and means George Washington, the algorithm would be able to identify that it is George Washington.

Also, if the user only says George, then there is an ambiguity as to which this person is or what entity this actually is, as George could mean people with the name George or part of an airport or even a restaurant.

This is the classic case of ambiguity where the users will be asked to mention the full name of the person, location or company the user intends to mention Example 3

There are some named entities which cannot be resolved without having a mandatory common noun inside them. e.g. "US Airways" is a good example for a mandatory common noun indicator.

"US" by itself can be a country. A mandatory common noun indicator of "Airways" would ensure that if a user inputs only US.

Sentences like "I fly US Airways" would make sense as supposed to "I fly US" as the latter could also mean the user is traveling to USA.

All this is possible only through a Dispatcher and the UNKnown Token List Parser (which will be referred to as UNKTokenListParser). The dispatcher takes care of the set of UNKs to be passed to the UNKTokenListParser to find out the Named Entity (ies) in the Unknowns (UNKs) mentioned in the sentence.

Figure 6:
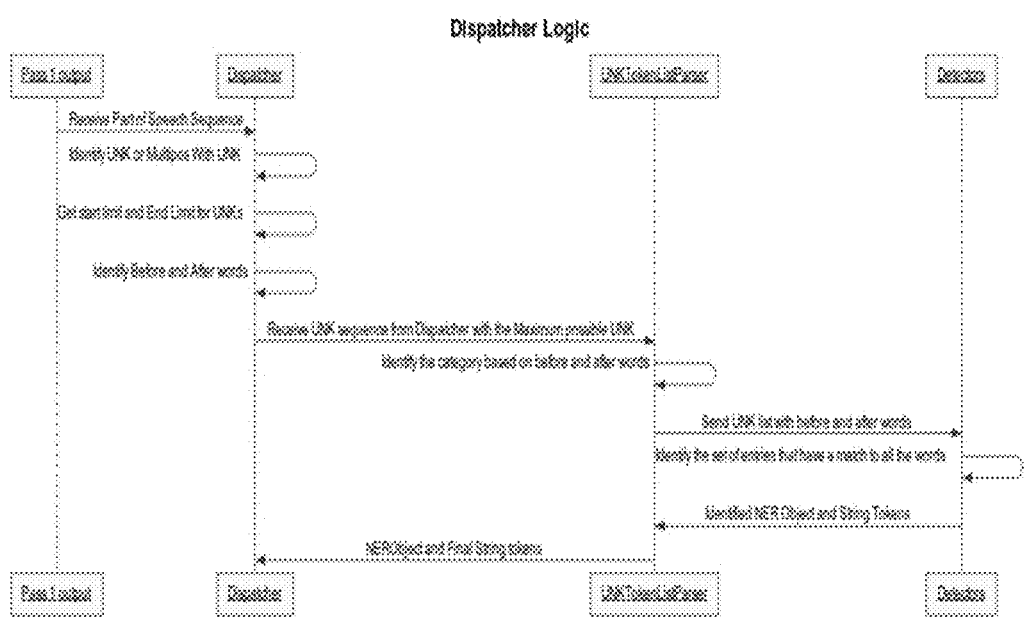
FIG. 6 is a diagram of dispatcher logic.

Referring now to FIG. 6.

This algorithm is shown by a sequence diagram as follows

Sequence of Steps

The sequence of steps for this is as follows

1. The dispatcher receives the part of speech sequence as well as the string sequence from the user input.
2. Then the Dispatcher identifies the first UNK in the string sequence. This can be either a multiPOS (Consisting of multiple POSType) with a UNK in one of the POSTypes or a UNK. (An example of multiPOS would be "bear". This is a name of an animal and also a verb as in "bear the burden")
3. The dispatcher iterates through the rest of the sequence when one UNK is found to find the set if UNKs to the right of the UNK as well as the start and end limits of the UNK sequence.
4. Finds 2 words before and 2 words after the UNK sequence
5. Passes the sequence of UNKs along with the before and after words to the UNKTokenListParser
6. The UNKTokenListParser then tries to identify the right detector to be called based on the before and after words for the UNK. If that is determined, the appropriate detector is fired. Else, all the detectors with no set category is fired.
7. The detectors then try to find a match with the token (UNK word). The entries in the HashMap would contain entries pertaining to all possible inputs that could be detected. The map is looked up to find out the set of entries that match the token.
8. Each token is looked up in the same manner and the resultant set of entries in the hashmap would then be subject to intersection to find out the entry(ies) that match all the input tokens.
9. If there is a unique entry that comes out of the intersection, then the result Named Entity is created and sent back to the UNKTokenListParser which is then sent to the dispatcher along with a flag if the match has been found. If not, then the flag would be false.
10. If there were multiple entries that match the criteria, an exception would be thrown stating that there are multiple matches to the same user input and a more refined input needs to be given by the user. (Maybe the category or the full name of the proper noun needs to be specified)

Filtering Ambiguous Entries

1. When there are multiple entries of the same name but of different type, then there needs to be an algorithm to separate the multiple entries and identify the correct input
2. The objective of this algorithm is to identify the correct type of input the user has mentioned in the event of the user not mentioning the type of entry (User mentioning the airport name but not the word "airport" which might result in a confusion)

3. This is done through a set of rules mentioned in pass 2.5
4. The algorithm is based on the likelihood of occurrence of multiple data types for one or more UNKs in an island of UNKs in a sentence
5. The UNKs within the island individually can have a different identification which could be of type similar or dissimilar to the final data type.
6. The algorithm can be explained by an example as follows.

Example 4

Consider the example "Ronald Reagan Washington" (national) (airport)
The user can directly specify only the name of the place and not necessarily indicate the type of the location. In this case, Ronald Regan Washington is the name of the airport. However, this looks like the name of a person.
276. The parameters in this case can be classified as follows
   Ronald→Ronald (First Name)
   Reagan→Reagan (Last Name)
   Washington→Washington (Last Name)
      Washington D.C. (City)
      Washington (State)
In this case, the consecutive occurrence of a first name, last name and a probable location can indicate an airport.
This is not just a location but has the highest possibility of being an airport as the full name of a person is mentioned followed by the location. Therefore, a rule in pass 2.5 is mentioned as follows
NNP (FirstName) NNP (LastName) NNP (Location)→NNP (Airport)
This means if you find a proper noun (representing a first name) followed by a proper noun (representing a last name) followed by a proper noun (representing a location) then COMBINE them and consider the COMPOSITE ENTITY as a Named Entity i.e. proper noun of type Airport.
The advantage with this kind of a rule is that if the airport name is misrepresented or if the database does not contain that particular airport, it would still be recognized as an airport.
However, it would not be able to identify the specific details of the airport as the airport is not known completely.
This gives a chance for the engine to mention that an airport has been mentioned but is not able to identify the specifics of the airport
The specific follow up question prompts the user to give more information regarding the airport or if the user actually intended to mention airport
285. Example 5
   Hilton→Hilton (Last Name)
   Manhattan→Manhattan, N.Y. (Area)
Another pertinent example can be identified for hotels "Hilton Manhattan"
The combination of a last name and area would usually end up being a hotel in a particular location. This would prompt the rule
Hilton by itself is the last name and could easily be a person. Had there been "Mr." or "Ms." Or some way of representing a person preceding the UNK values, then the identification would override the generic recognition which would result in the outcome based on the rule below
   NNP(LastName) NNP(Location)→ NNP (Hotel)
Furthermore, there are a number of Hilton hotels in USA. The place "Manhattan" gives a better indication of which Hilton hotel the user is talking about Example 6

Figure 7:
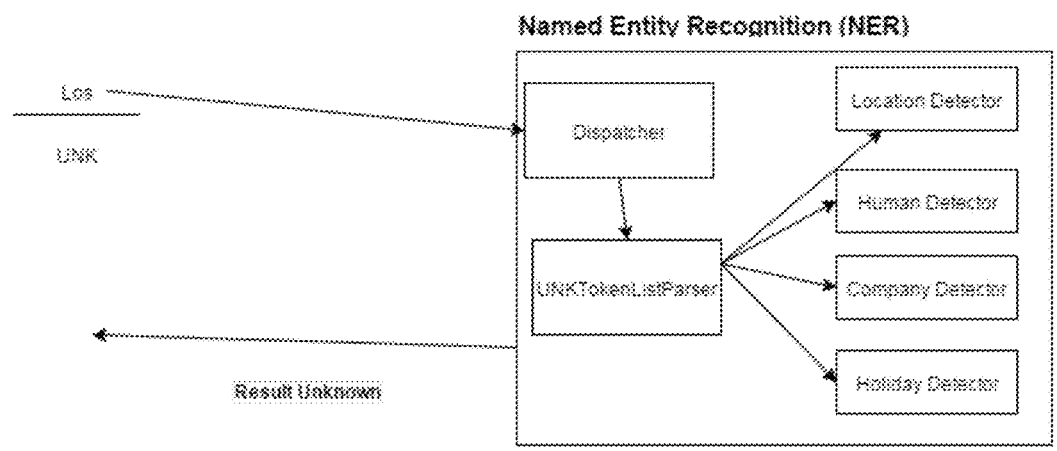
FIG. 7 is a diagram of the name entity recognition module.
Figure 8:
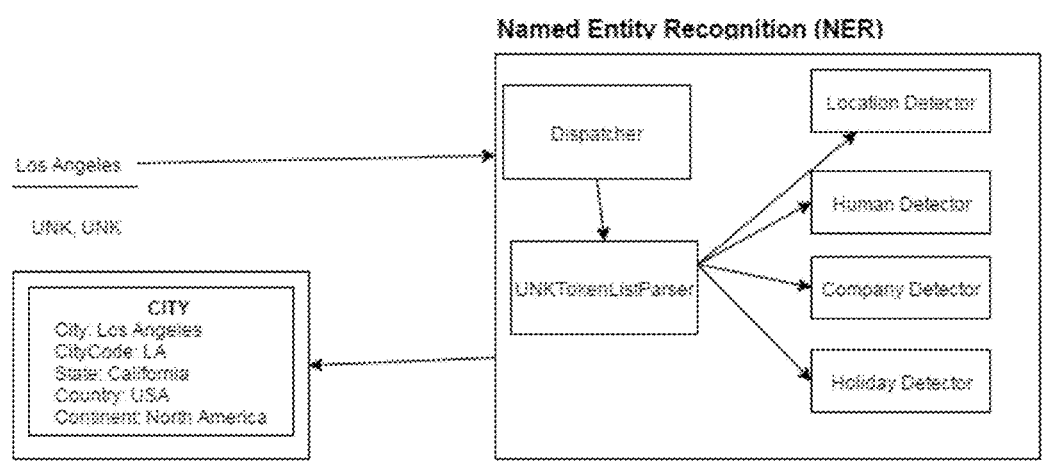
FIG. 8 is a diagram of the name entity recognition module processing information.
Figure 9:
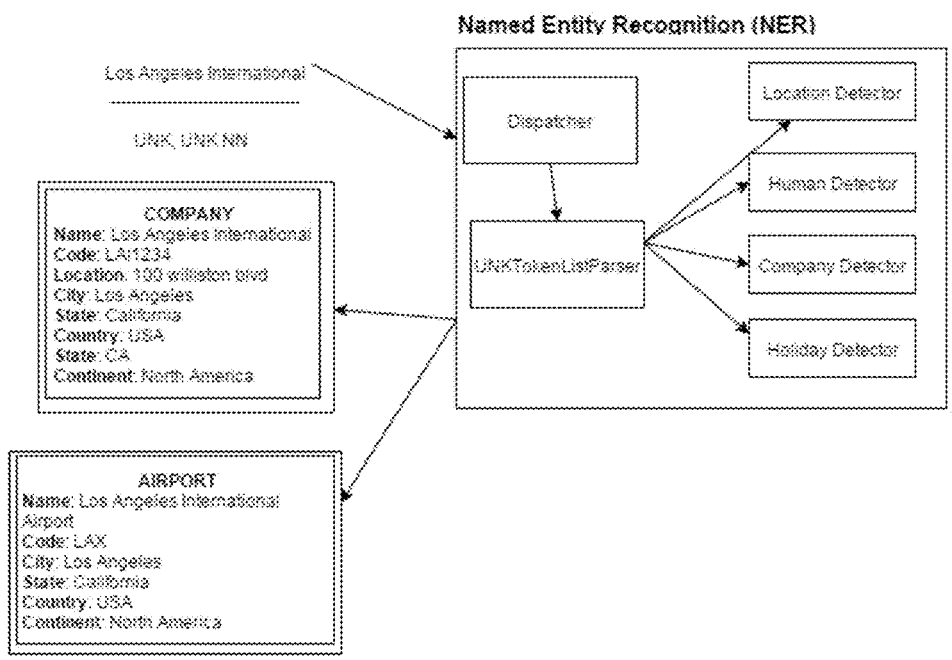
FIG. 9 is a diagram of the name entity recognition module processing information.

293. The best example for a complex user input would be "Baltimore Washington Thurgood Marshall" (international) (airport)
   Baltimore→Baltimore (City)
   Washington→Washington (Last Name)
      Washington D.C. (City)
      Washington (State)
The idea behind using this example is that the combination of one or more UNKs would result in a different named entity. To identify the correct named entity, the sequence types of proper nouns should also be considered.
The logic would be to identify the each named entity incrementally based on the number of UNKs. This is called incremental entity recognition
The idea is explained pictographically as follows
297. Consider the example of Los Angeles International Airport
   Los→UNK
   Angeles→UNK
   International→NN(Company, Airport)
   Airport→NN(Airport)
Each word has a specific POSType associated with them. The idea behind the incremental algorithm is to identify the different types of named entities at every encounter of UNK and subsequent keywords to filter and thereby identify the correct entity considering all the postypes.
Step 1:
In the first step, the first UNK (Los) is sent to the named entity recognition module.
Referring now to FIG. 7.
As shown in the figure, the UNKTokenListParser takes over the processing and sends the UNK to the detectors in the module to identify the type of the entity of the target word
In the first step, Los could not be identified as any named entity and therefore the NER module returns a Result Unknown
Step 2:
Referring now to FIG. 8.
The second step involves sending Los and Angeles (the first 2 UNKs) to the NER module. The result from this input is that the city "Los Angeles" is identified. The city is not just the only recognition; the particulars of the city such as the code, the state, country, and continent are also identified.
The identified particulars of the city are then sent back for processing in further passes. This semantic object is retained but there is a further likelihood that the further passes that are remaining might identify a different named entity.
Step3:
Referring now to FIG. 9.
In this step, since the UNKs are processed already, the succeeding words are added into the processing that might give a different kind of a named entity. In this case, the words Los Angeles International are being sent to the NER module.
When this happens, the NER module was able to identify two types of entities. Los Angeles
International as a company, and Los Angeles international as an airport. Both the entities are returned back. The semantic objects are identified along with the other details. The company value object contains the name of the company, company code, location, city, state, country and continent. The airport value object contains the details of the airport such as the name, airport code, city, state, country and continent.

All the details for both the Named Entities are retained in the event that there is no further processing required or if further processing does not result in a positive result. However, the ambiguity is still preserved.

Figure 10:
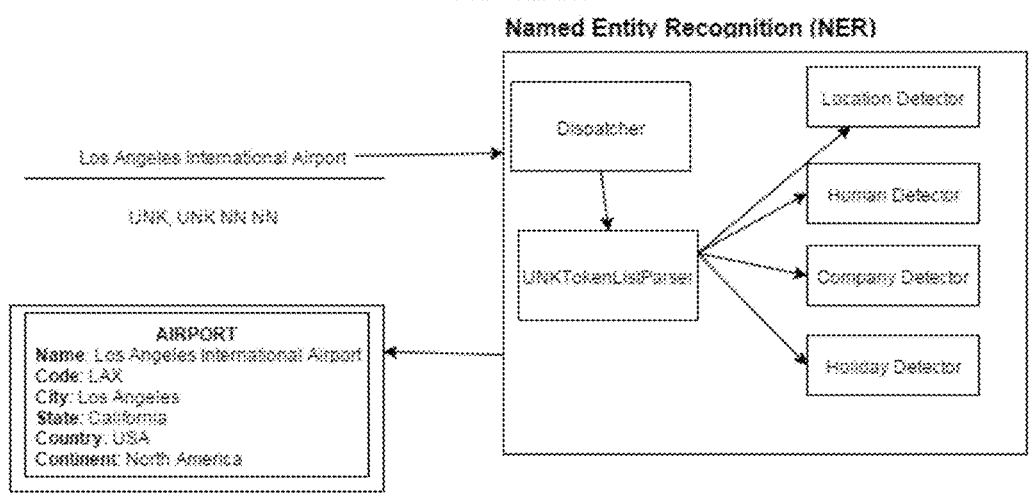
FIG. 10 is a diagram of the name entity recognition module processing information.

Step4:

Referring now to FIG. 10.

This step involves sending 4 words Los Angeles International Airport to the NER module. The processing happens to identify if there is a named entity with that name and the key words (international, airport) specified so that the type of entity can also be filtered. The outcome of this is also assisted by the concept lexicon filter that reduces the number of probable entities based on the keywords specified after the set of UNKs.

The outcome of this example is the airport of name Los Angeles International Airport located in the city Los Angeles, in California State, in the country of United States of America, in North America continent.

The concept lexicon filter enforces the airport and company database lookup to find the airport or company of name "Los Angeles International".

When the result is positive, the POSType(Part of Speech Type) is converted to Airport, Company from city.

In this case, there is an ambiguity of the same being a company and also an airport. There is also another noun to be looked up to the right hand side that might give further information.

When the next word is considered, it is clear that the expression was for "Los Angeles international airport" and therefore will be considered.

The POSType is converted to NP (Airport) in the POSType array.

The incremental entity recognition is summarized by the diagram below

Figure 11:
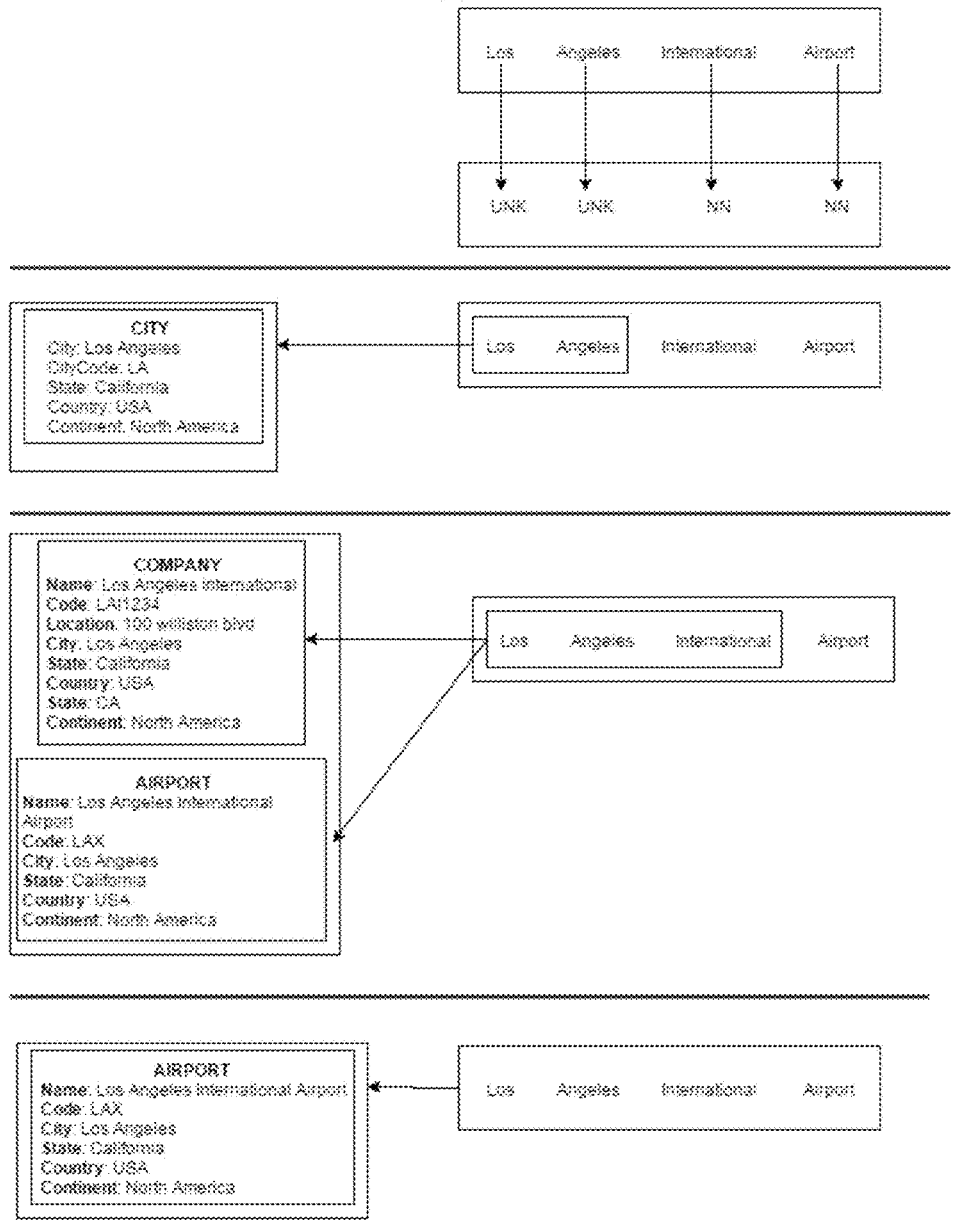
FIG. 11 is a diagram of the name entity recognition module processing information.

Referring now to FIG. 11.

The additional information if an airport in the input sentence is depicted in the following screen shot.

Figure 12:
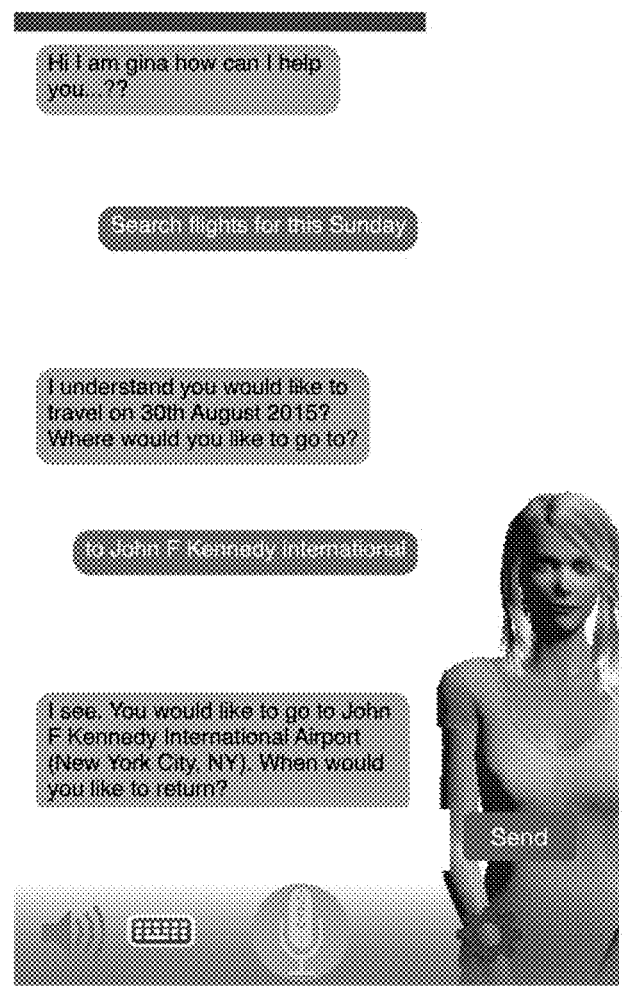
FIG. 12 is an illustrative representation of mobile device screen shot.

Referring now to FIG. 12.

As shown in the screen shot above, the information about the airport (name, city, state) are depicted on screen for the user showing further proof that the airport has been identified properly.

The screen shot also shows the further steps in finding out the travel criteria where the user has already mentioned the travel date. However, the return date has not been mentioned yet and therefore is asked for one.

The first step is identifying the words in the lexicon if they exist.

If they exist, then their POSTypes are determined accordingly. If not, they are named UNK The island of UNKs are sent to the named entity recognition module for processing The named entity recognition module takes in the first UNK and tries to identify the entity and it's type In the above case, "Los" is not part of any named entity and therefore is still an unknown The next UNK is considered and the process is repeated.

"Los Angeles" is a named entity and is a city. Therefore, a city is identified along with further details of the city In the next step, the NN along with the UNKs is considered. "Los Angeles International" could be identified as a name of a company or an airport. The idea of the incremental entity detection is not just identifying the type, but also disambiguating the type of elements.

If "Los Angeles International Airport" is mentioned, then the disambiguation is easy because of the word "airport" which signifies the airport.

This takes higher precedence as the total number of tokens combined with the tokens of POSType NN is also considered.

For Los Angeles International Airport

Let total number of tokens=x;

Calculate the total number of tokens:

Number of UNKs→2

Number of NN→2

Total number of tokens→4

Therefore, x=4;

For Los Angeles International

Number of UNKs→2

Number of NN→1

Total number of tokens→3

Therefore, x=3;

Example of array of tokens→Array A=[Los, Angeles, International]

Let the function in NER Module be F(A) where A is the input array

```
for (i = 1 ..N) {
find the elements starting from 0 to i and place in array
send the array to NER module
    a. output = F(A)
    b. Store the output in another array to make sure the values are
       preserved
}
```

The same process repeats if the input is Los Angeles International Airport Since Los Angeles International Airport (4) has more tokens than Los Angeles International (3) Los Angeles International Airport takes higher precedence.

In the case of Los Angeles International, a disambiguation algorithm needs to be utilized This happens in the pass 5 where if a sentence is mentioned like "I would like to travel from Los Angeles International" the verb and preposition mentioned in the sentence can signify what kind of word it is The type of verb in this case is VB (Travel)

In other words, "you can travel from a location but not from a company"

Therefore, Los Angeles International can be identified as an airport

Figure 13:
FIG. 13 is an illustrative representation of mobile device screen shot.

Referring now to FIG. 13.

This process is explained in the form of a flow chart as follows.

Figure 14:
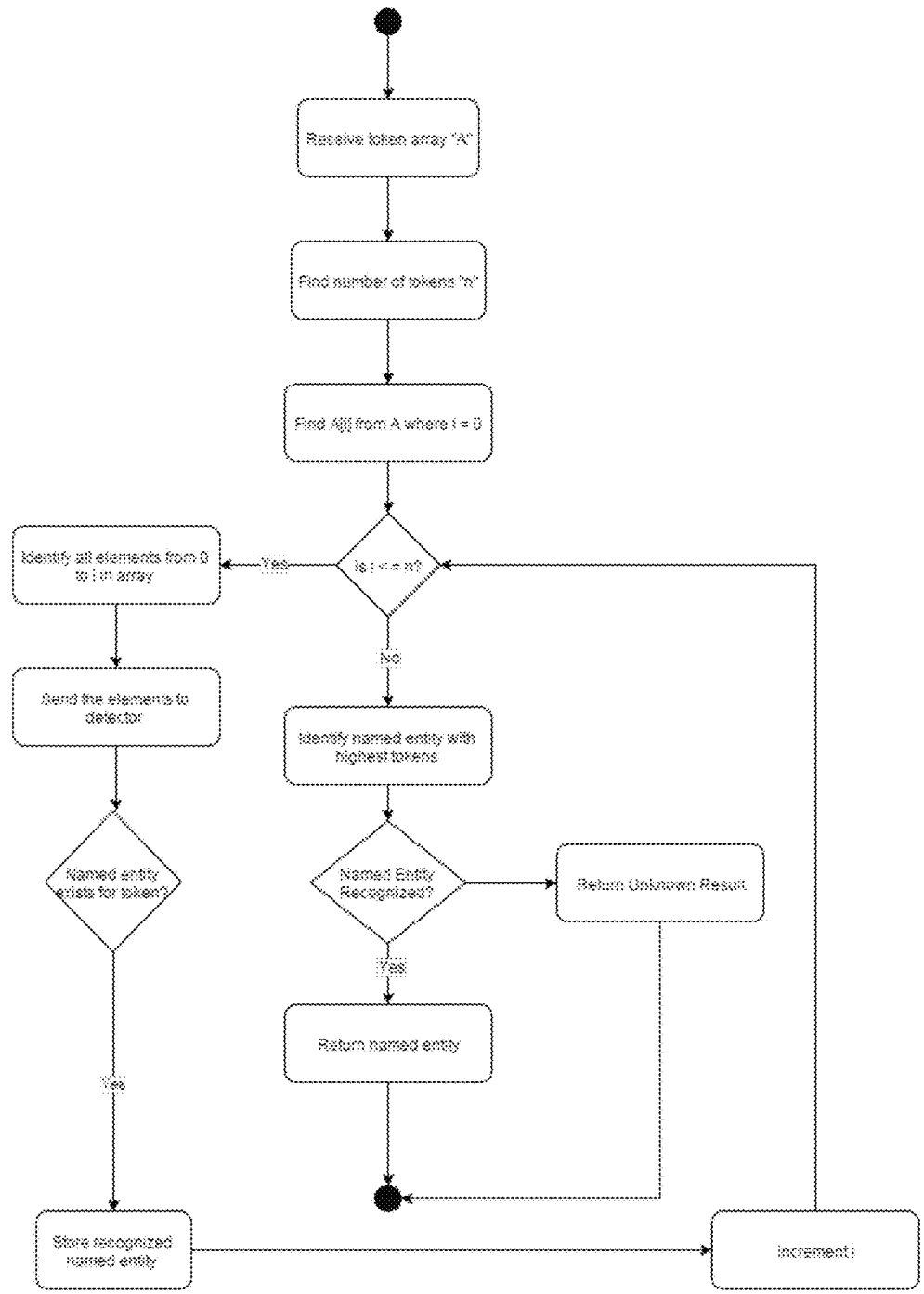
FIG. 14 is a diagram showing token for the NER.

Referring now to FIG. 14.

The incremental entity recognition is the best way to detect named entities (i.e. person names, locations, companies etc) in an incremental and adaptive manner where other named entities exist inside the subset of tokens is enclosed inside other named entities represented by more than one token.

Concept Lexicon Filter

The Concept Lexicon Filter plays an important role in filtering ambiguous entries. When the user enters a random or specific proper noun, the type recognition of the entity is done easily when there are words that are specific to the type of the proper noun.

If the user mentions something like "Rotura" (a city in New Zealand) and the intelligent Agent does not recognize the location, it would be easier to identify that this is a city when the user would say "Rotura city"

Therefore, the intelligent Agent can understand that this is a city the user is trying to mention and would be able to add this into the database but only after confirming that this is a city the user would like to mention later on and should be considered.

The filter and the algorithm can be explained as follows

This contains the set of keywords that would give more information regarding the proper nouns.

These key words are used to identify the type of proper nouns mentioned in the island of UNKs For instance, These words represent the type of named entities being detected in the Named Entity Recognition Airport: international, intrl, airport, municipal, domestic etc., Airline: Air, Airlines, Airways etc., Company: international, intrl 435. The resulting tree structure would be as follows
VB (Search)→PP (from LAX)
NP (Flight)→PP (to JFK)
This can be elaborated by a more comprehensive example as follows Example 1

"Search flights from Los Angeles International Airport to John F Kennedy Airport"
  a. In this case, both LAX and JFK are airports. But the prepositions "from" and "to" before the airport names signify what kind of airports they are (Arrival/Departure).
The case is similar with dates. If the user mentions a particular date as a starting date and another date as the return date the other words (Parts of Speech) surrounding the date expressions enable the identification of the date expressions as start date and end date
Different ways that have been considered are as follows.
(I want to) search flights from LAX to JFK
search flights departing from LAX arriving in JFK
search flights that are departing from LAX and are arriving in JFK
Each different format can be identified based on the verb, the direct mention of the start and end locations, or with the prepositions
The subject, verb and object in a sentence mentioned in the user input are distinguished based on the prepositions and secondary verbs. This helps in syntactic tree formation.
After the hierarchy is established in the tree, the semantic conversion understands the phrases mentioned for different search criteria.
Consider the following example Example 2

Figure 15:
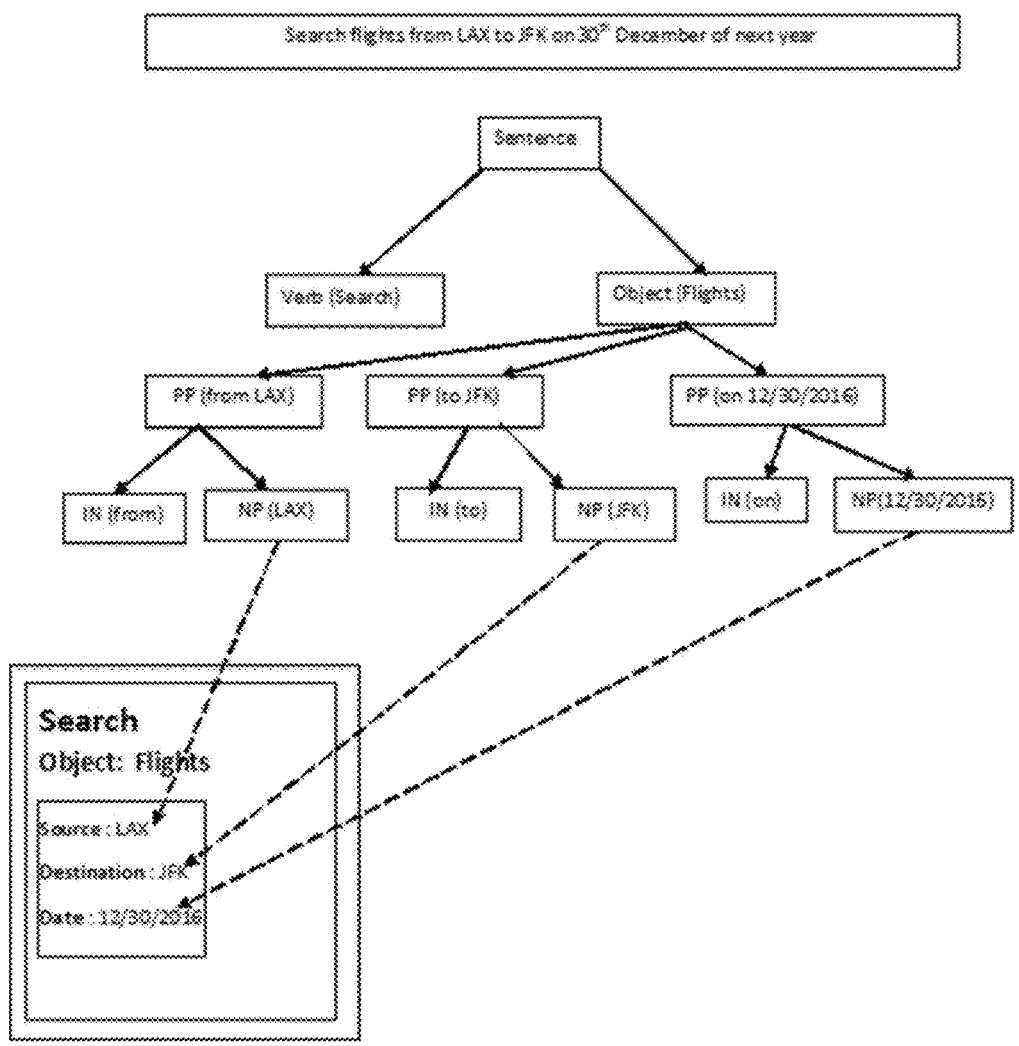
FIG. 15 is a diagram showing flight decision path.
Figure 16:
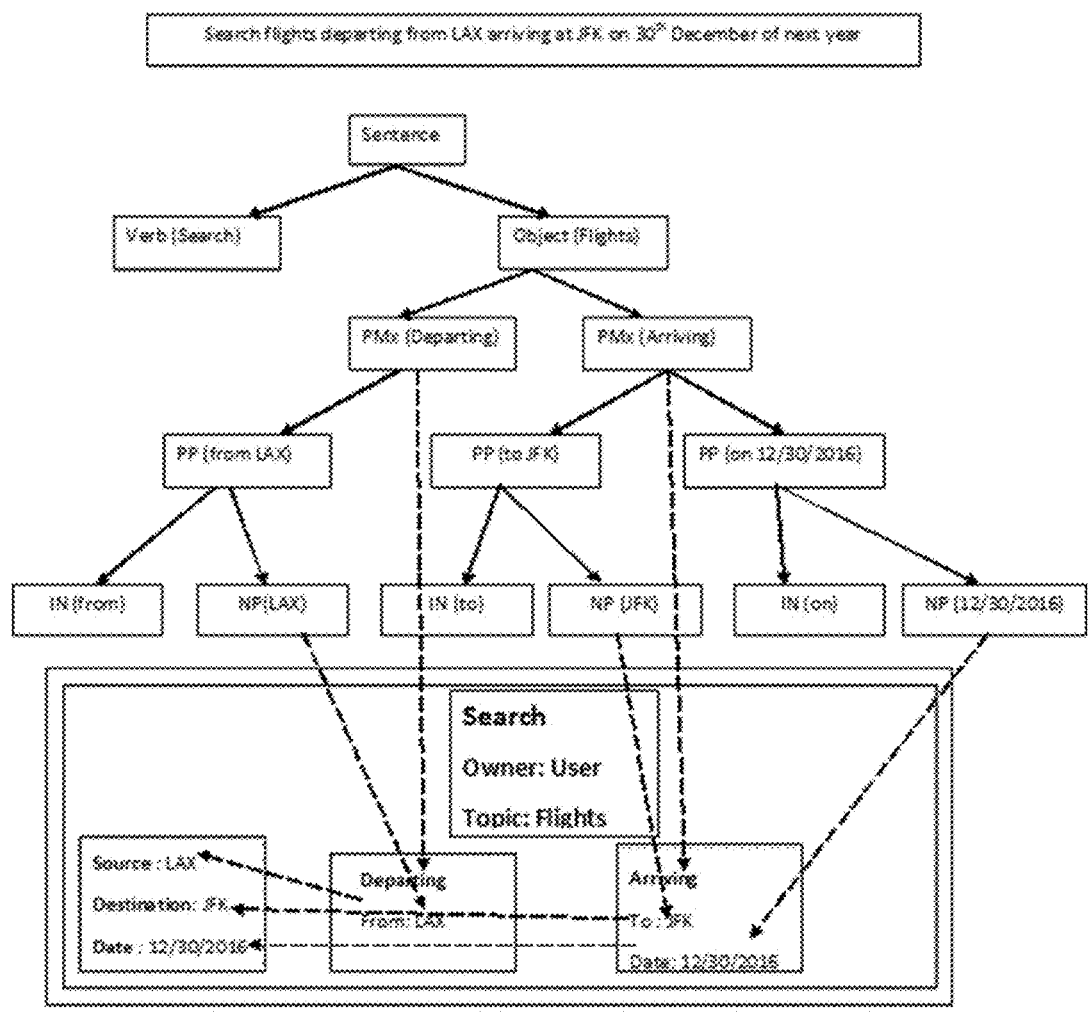
FIG. 16 is a diagram showing flight search path.
Figure 17:
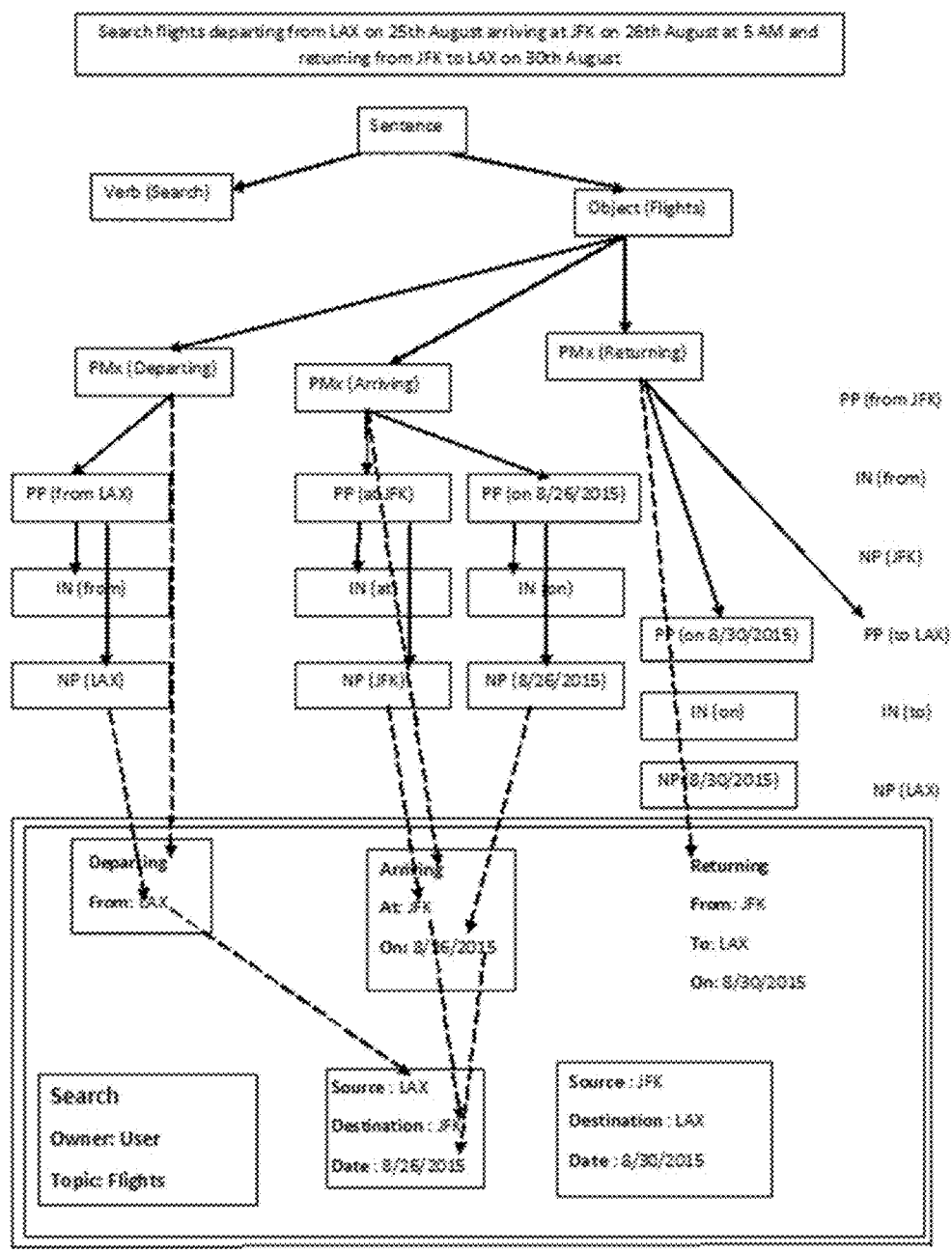
FIG. 17 is a diagram showing flight search path.

The syntactic result of the sentence is then converted into a tree. For instance, taking the previous Example:
Search flights from LAX to JFK tomorrow
The subject is "search" object is "flights" and anything else added to the sentence become parameters that have to be considered to understand the sentence.
Referring now to FIG. 14.
The output for this sentence after syntactic conversion is as follows
As seen in the above output, the event "VB-SEARCH" which is also the verb has an object "NP-FLIGHT"
That contains properties such as
PP→From (IAD)
PP→To (JFK)
PP→(30 December next year)
The 3 properties which have been computed and values have been identified are combined into a tree with the verb (Event) as the root and the rest of the parameters are built as children to it.
This gives a disambiguation between like parameters, identifies the search criteria correctly and creates the tree to be later inferred into a proper meaning.
Post Modifier (Secondary Verb):
Another kind of expression that a user can use would be through a secondary verb. The example for that would be
Referring now to FIG. 15.
"Search flights departing from LAX arriving at JFK tomorrow"
In this case, there is the main verb in the sentence "search" along with two other secondary verb "departing" and "arriving" that changes the attributes of the object (flights). The secondary verbs are called "post-modifiers" (PMx) as they change the attributes of the objects through a sub expression of their own.
A post modifier gives an elaborate representation of attributes.
Post modifiers explain what the attributes in a sentence are and how they are related to the subject/object
Post modifiers are identified in the tree above other phrases like from LAX, to JFK etc.,
Phrases are then assigned to the post modifiers which would then be converted semantically to identify the search criteria.
A tree representation for the above sentence would look like this.
Referring now to FIG. 16.
This shows the post modifier changing the attributes of the object. Also, the processing happens separately for each of the sub PP that is represented by the rectangles around the PP. This shows that for each PP that needs to be made, a preposition and a noun need to be together so that the computation and understanding is done properly.
This enables the application to understand user parameters correctly and to act according to the information provided by the user.
Post modifier enables the subject/object of a sentence to be enhanced.
More details are mentioned about the subject/object in a post modifier.
The travel criteria are identified based on the type of post modifier. For example: Arriving at would be considered at destination where as departing from would be considered as source
Apart from elements for source and destination, other criteria like number of stops (one stop, two stop etc) start date, end date etch can also be identified.
Post modifiers also enable identifying criteria based on grammar while still maintaining the grammar of the sentence
On a larger scale, when there is a composite sentence that involves a return journey as well, the starting journey and return journey both have to be computed. This is similar to combining more than once sentence into a single sentence as shown in the figure below.
The sentence for this demonstration is "Search flights departing from LAX on 25 August at arriving at JFK on 26th August at 5 AM and returning from JFK to LAX on 30 August"
Referring now to FIG. 17.
Algorithm
Prepositional phrases (PP) and Post modifiers (PMx) are identified in pass 4.5
Each PMx is classified and identified as a hierarchy in the tree which is constructed in pass 5
The category of the PMx based on the secondary verb and preposition
Each PMx would be associated with the secondary PP values that contain the information for given by the user
Each search criterion is identified based on the secondary verb and the preposition
The content for each criterion is identified by the NP within the PP
All the criteria are identified from the tree are then utilized to make the call to retrieve flight details Elaboration:

As seen in the above tree, the request was for a journey from LAX to JFK on August 26 and return journey from JFK to LAX on August 30.

For this sentence, the search criteria have been mentioned in 3 secondary verbs (departing, arriving and returning)

The 3 secondary verbs enhance the object of the sentence flights and specify search criteria for travel.

The ability of the system is to recognize that departing and arriving are secondary verbs that mention the criteria for the starting journey and that the returning, which is a part of another sentence joined by a conjunction "and" in the sentence have been recognized.

Figure 18:
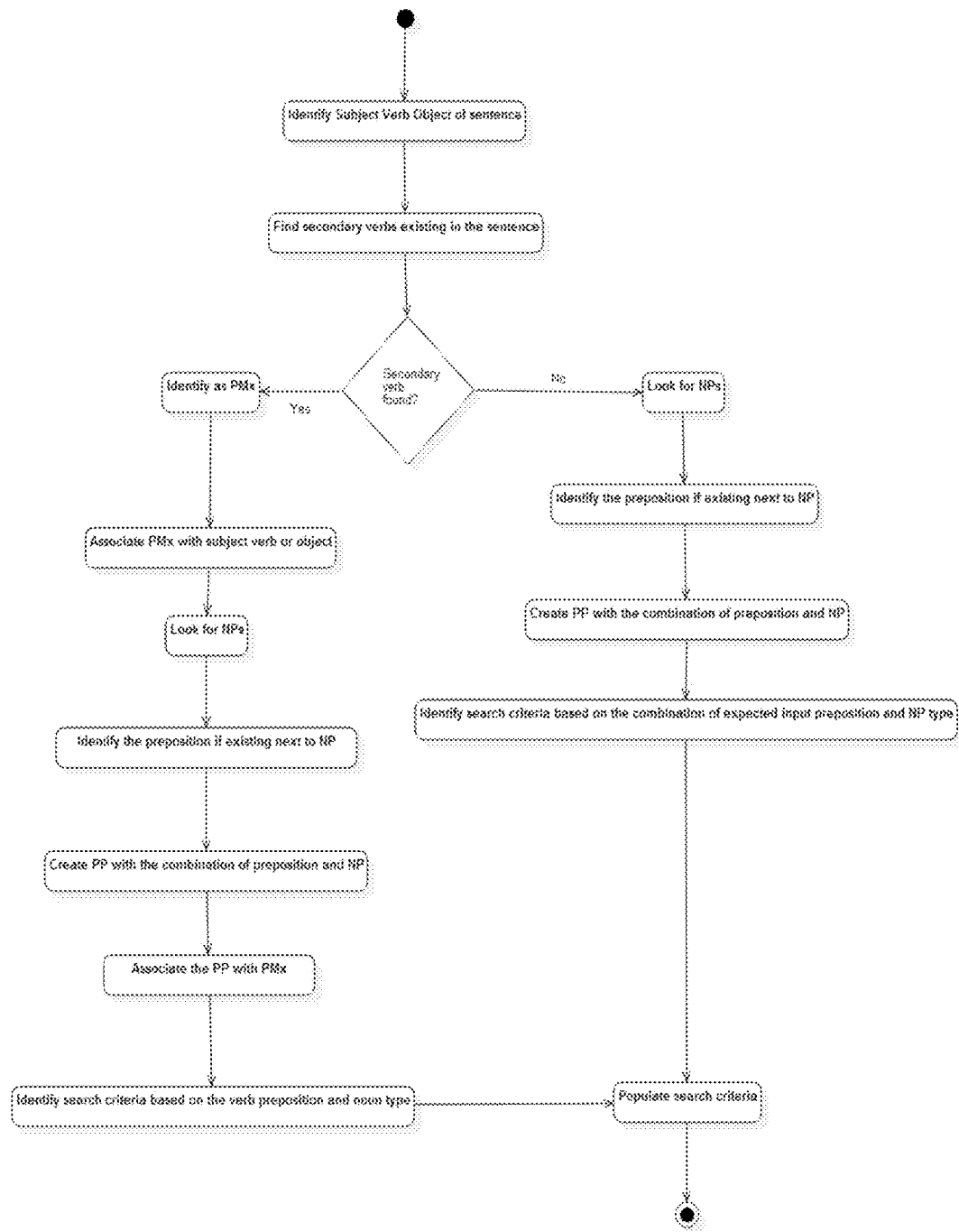
FIG. 18 is a diagram showing information processing.

In this sentence, the return journey has been fully mentioned with all the search criteria. But had the sentence not mentioned the return source (which means that if the sentence was "and returning to LAX" instead of "and returning from JFK to LAX") the engine would still recognize that the source for the return location is LAX This process can be explained in detail by a flow chart as follows Referring now to FIG. 18.

Feature #3. Intelligent Travel Planning

A method to identify the most optimal Mode of Transportation (MOT) available for the given Start and Destination Location based on various parameters including
a. the Total Distance,
b. the Total Cost (eg. For travel by road, fuel+toll charges+avg. layover expenses etc.) and
c. the Total Time (eg. For travel by flight+time to reach the airport+check-in time+actual travel time+time to reach destination location)

while considering the user's preferences.

Introduction

Assuming a user indicates to the Intelligent Agent about going to a destination (e.g. "I would like to go to Las Vegas"), the intelligent Agent then needs to come out with all sorts of Travel plans including Multiple Options for each indicating:

Mode of Transportation

Total time taken to travel from point to point

The factors that help determine the mode of transportation include:
a. User Preference: The User Preference holds the highest priority. For eg, assuming the user wants to travel domestically i.e. from one state to another. Although, traveling by flight may be faster, the user may directly indicate travel by road by saying for example, "Navigate from New York to Las Vegas by road"
b. Total distance: The total distance between the start and destination location (including intermediate stops/points) holds the seconds highest priority in choosing a Mode of Transportation. For eg, assuming the user wants to travel from one part of a city to another, the user would rather choose the road or subway than traveling by flight since the distance is less. On the other hand if the user wants to travel internationally where the distance may be more than 1000 miles, traveling by flight would be preferred over traveling by any other mode of transportation.
c. Total Travel Time: The total travel time from the start location to the destination location including check-in time, average time spent in queues etc. holds the next priority in choosing a Mode of Transportation. For eg. Driving from New York to Philadelphia would be faster (approx. 2 hours) than a flight including the (approx. 60-90 mins check-in time+time spent in queues+approx. 30 mins of travel time to and from the airport both ways+30 mins actual travel time which comes to approx.=2.5 to 3 hours of total Travel Time)
d. Total Cost: The total cost of the trip from the start location to the destination location including cost of tolls or in case of a long distance trip the avg. cost of Layover Accommodation etc. holds the next priority for choosing a Mode of Transportation. For example, driving short-medium distance between states would be cheaper than taking a last minute flight.
e. Convenience for the user: The convenience for the user can be defined as:
f. Ability to get the tickets easily (if it is through a public transport)
g. Convenient travel timings (e.g. very late in the night, too early in the morning would be inconvenient)
h. Layover Accommodation (in case of long journeys)
i. Inconvenience of carrying the heavy baggage while traveling in a public transportation (e.g. Flights may charge heavily for extra baggage)
j. Queue Wait times X The no. of such queues (e.g. wait times at the airport check-in, security queues, wait times at the toll booths on highways etc.)

Algorithm

The locations maintain a hierarchy as shown in FIGURE below.

Figure 19:
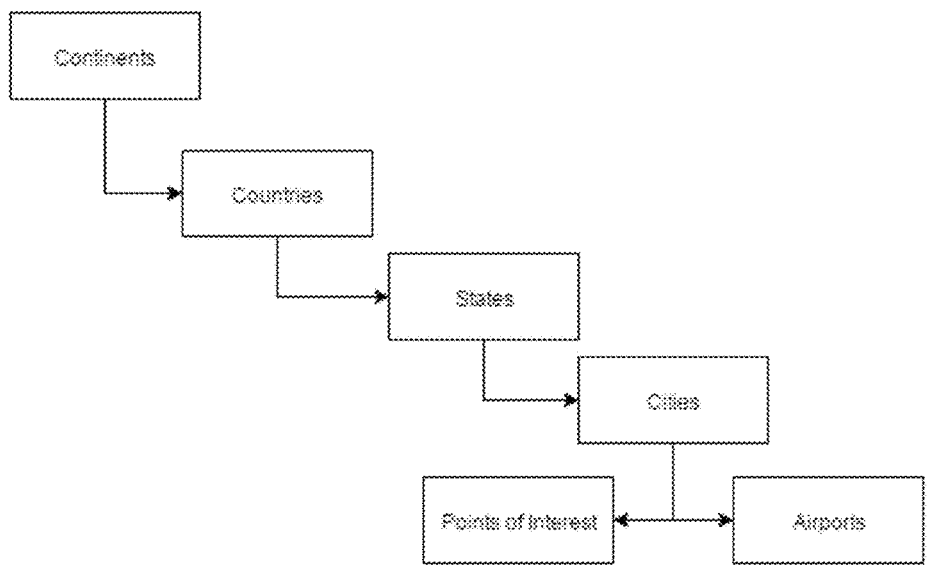
FIG. 19 is a diagram showing geographic discernment.

Referring now to FIG. 19.

Location Hierarchy

Figure above shows various abstraction level of location e.g. city, state, country, continent etc.

The Lowest Abstraction Level that is common to the starting location and the destination location usually determines the scale of the travel.

Examples

If a user travels from one neighborhood to another, the lowest abstraction level is City because he is traveling within the same city or between cities.

If a user travels from one city to another, the lowest abstraction level is Metropolitan Area/County because he is traveling within a Metropolitan Area/County or between Metropolitan Areas/Counties.

If a user travels from one county to another, the lowest abstraction level is State, because he is traveling within a State or between States.

Furthermore,

Various Means of Transportation (MoT) have a Distance Scale associated with it.

The figure below is an Illustration of the Distance Scale for various MoTs

Figure 20:
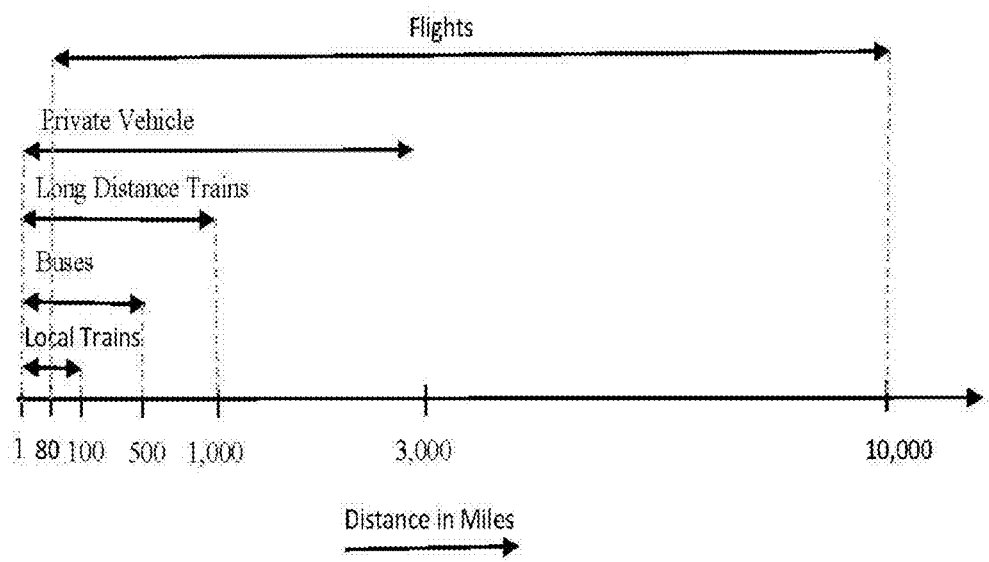
FIG. 20 is a diagram showing ground transportation.

Referring now to FIG. 20.

For example:

Local Metro Trains usually travel a distance ranging from less than a mile to 100 miles.

Buses can travel a distance ranging from as less as 0.1 miles to 500 miles.

Long Distance Trains e.g. Amtrak can travel a distance ranging from as less as 1-2 miles (between 2 stations) to as large as 1000 miles.

Cars i.e. Private MoTs have a very wide range i.e. a distance ranging from few blocks i.e. 0.1 miles to as high as 3000 miles (assuming coast to coast travel).

Flights are usually available for a distance ranging from 80 miles to 10000 miles etc.

The Possibility Computation Phase compares the distance to be traveled from the start location to the destination location and then maps it against the Means of Transportation (MoT) whose distance ranges match or include the distance to be traveled. For example, if the user wants to travel from one city to another, where the distance between the start and destination location is approx. distance of 50 miles the MoTs that will be matched are: Local Trains, Buses, Long Distance Trains and Private Vehicles. However if the user wants to travel from one country to another where the distance between the start and the destination location is approx. 4000 miles, only the Flight MoT will be matched.

After the Possibility Computation phase there are one or more MoTs that are considered possible.

The MoT Availability Computation Phase:

In this phase the focus is on resource availability. E.g.

If you are driving, do you have a car available OR

If you are flying, then do you have flights available at that date/time.

None of the factors like total cost, travel distance, travel time, convenience etc. are considered at this point. Different systems are integrated to check the availability. E.g. Flights are checked with a Travel Backend Gateway showing flight availability at the given date/time. Rental car availability is checked with a Travel gateway showing Rental car availability near a particular address.

Then comes the MoT Optimization Phase.

The Decision Component chooses an optimal MoT based on one of the following factors:
1. Total Cost: eg. Flights are more expensive for short distance. Road is more expensive for long distance.
2. Travel Distance: Flights are shortest because they travel in a straight path, Trains are second shortest and a bus/private vehicle involves roads which are longer because there may not be a straight path from the start location to the destination location.
3. Total Travel Time: Flights are usually the shortest for medium to long distance, Trains or Buses/Private Vehicle may be shorter depending on the route.
4. Convenience: Flights are convenient for long distance with less baggage.

We provide equations to calculate the above using variables. Some of the variables may not be known and that can be derived from the Average Historical Statistics Module/ Previous interaction history module.

E.g. If the start location and destination location happen to be in the same city, then the Decision Component chooses the MoT based on the Travel Distance factor.

The logic behind this can be explained as follows:

If the user would like to travel specifically by road from New York City to Los Angeles, then any other logic behind determining the mode of travel is overridden.

If the user is traveling within the city, it does not make sense to suggest that the user travels by flight When the distance is for instance, from New York City to Pittsburgh, the distance from the two locations is first considered. The comparison of times taken by road and by flight would be considered and a consensus is given.

When the time of travel is considered, assuming the user is making a request to travel from New York City to Pittsburgh Pa., then the logic would be, "would it be better for the user to catch an evening flight today and reach the location in the evening or would it be better for the user to start now and reach the location by the evening.

Finally, is the user trying to reach the location with a minimum cost or trying to reach the location as soon as possible? What is the overhead if a different means of transport is chosen?

To identify the right means of transport, a series of calculations need to be done to find out the optimal type of transport.

Figure 21:
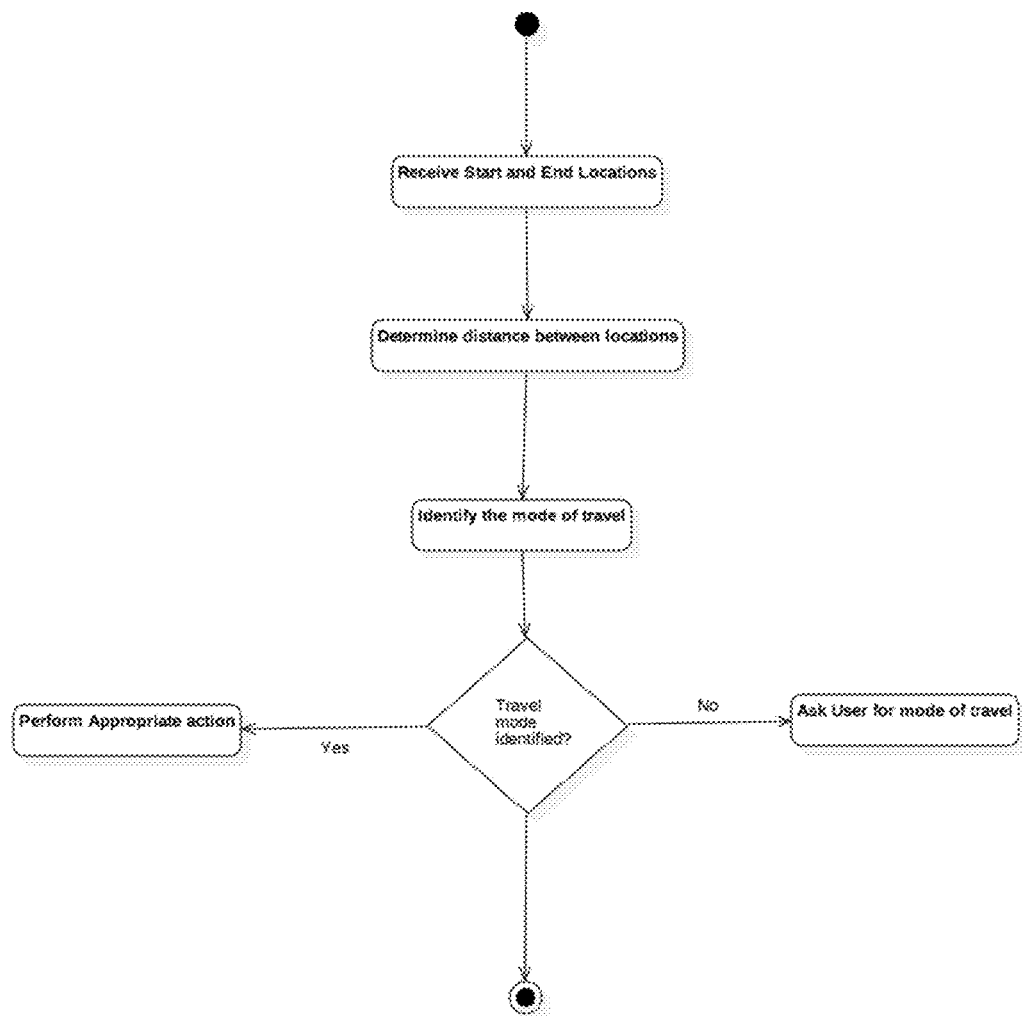
FIG. 21 is a diagram showing navigation information.

The decision making algorithm for distance is explained in the diagram as follows:

Referring now to FIG. 21.

Distance between locations is not always the criteria. Before checking the distance between locations, the locations could be identified if they are in different states, countries or continents.

If the two locations are in two different countries, the user is more likely to travel by flight than on foot or by road.

If the locations are within the same city, the user can be given driving directions between locations.

The user could also give two airports within the same city and that needs to be verified if they are in close proximity to find out the directions to the location.

The user could specify the mode of transport intended and that would override all the other algorithms. The distance need not be found out, the type of transport need not be determined.

Calculations

The highest Level of Importance (LI) is given for Distance, then for Time, then for cost.

The LI for preference is absolute and therefore has the power to override any and all calculations The calculations are based on overheads since a travel from Washington D.C. to Florida would be significantly lesser than a travel from Washington D.C. to India Therefore, an overhead needs to be calculated Distance The distance between two locations based on coordinates can be calculated with the "haversine" formula as follows:

$$D_{lon} = lon2 - lon1$$

$$D_{lat2} = lat2 - lat1$$

$$a = \operatorname{Sin}^2(D_{lat}/2) + \operatorname{Cos}(lat_1) * \operatorname{Cos}(lat_2) * \operatorname{Sin}^2(D_{lon}/2)$$

$$c = 2 * a\, \operatorname{Tan}(2*(\sqrt{a}, \sqrt{(1-a)}))$$

$$d = R * c \text{ (where } R \text{ is the radius of the Earth)}$$

Where:

R is earth's radius (mean radius=3,959 miles)

(lat1,lon1) represent the latitude and longitude coordinate of the start location.

(lat2,lon2) represent the latitude and longitude coordinate of the destination location.

d is the calculated distance between the start location and the destination location.

The Highest Specificity Variation Factor (HSVF) a figure that represents how specific a user is regarding location.

Figure 22:
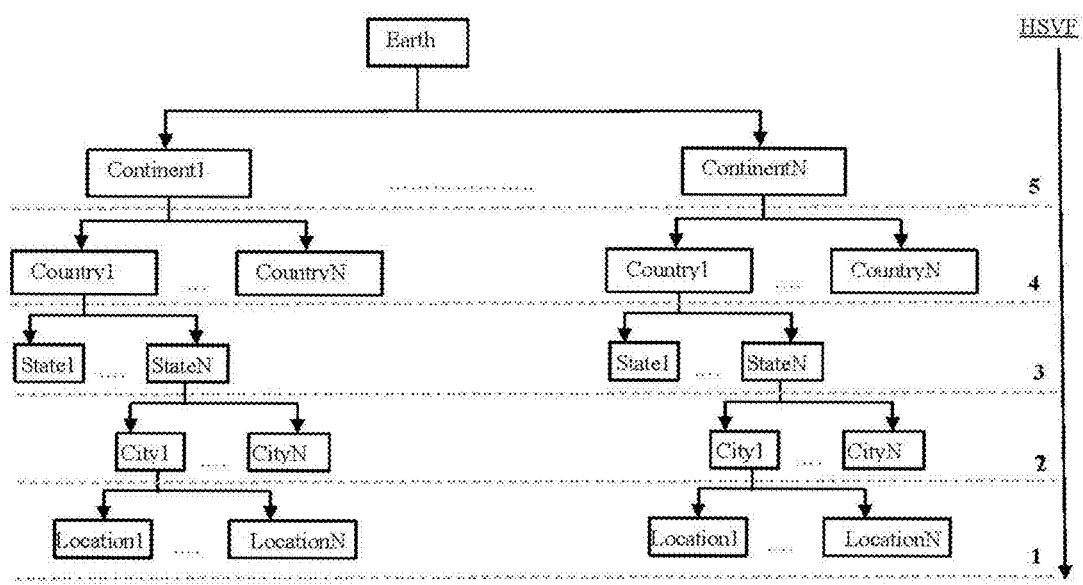
FIG. 22 is a diagram showing navigation information.

The figure below is an illustration of Location Hierarchy Trees for calculating the HSVF Referring now to FIG. 22.

The Location Hierarchy Trees of the Start Location and the Destination Location are created.

The Start and Destination Locations may be part of the same Continent or the same Country or the same State or the same City.

The Highest Specificity Variation Factor (HSVF) is the highest element in the location hierarchy trees of the Start Location and Destination Location that is different.

The HSVF is highest for a continent (i.e. if the user mentions two continents) and lowest for point of interest or airport (i.e. if the user mentions two airports)

For example, if the user mentions a particular restaurant in a city, then the user is being very specific regarding the location. If the user mentions a country (e.g. I would like to go to Uganda) then the user is not being very specific and therefore the specificity of the location is low.

The HSVF gives an understanding of how much specificity can vary if the user mentions a different (airport, city, state, country or continent)

Figure 23:
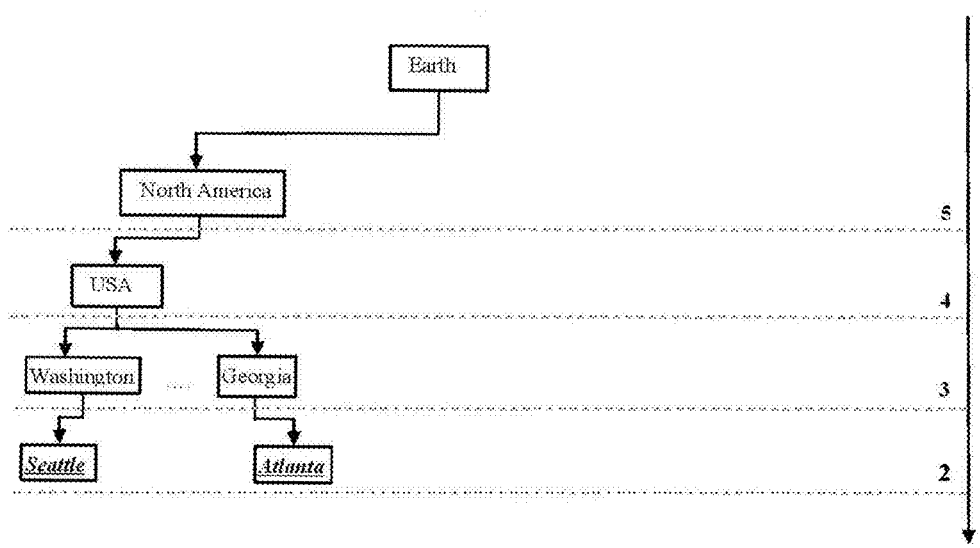
FIG. 23 is a diagram showing navigation information.

$HSVF_{Continent}=5$
$HSVF_{Country}=4$
$HSVF_{State}=3$
$HSVF_{City}=2$
$HSVF_{Airport}=1$
$HSVF_{POI}=1$ Example Assuming a flight search scenario where the user says, "I want a flight from Seattle, Wash. to Atlanta, Ga.". The following Location Hierarchy Trees are constructed:

Referring now to FIG. 23.
Source: Seattle, Wash.
584. Destination: Atlanta, Ga.

| Source | Destination |
| --- | --- |
| City: Seattle | City: Atlanta |
| State: Washington | State: Georgia |
| Country: USA | Country: USA |
| Continent: North America | Continent: North America |

$Continent_{source}==Continent_{Destination}$
$Country_{source}==Country_{Destination}$
$State_{source}!=State_{Destination}$
$City_{source}!=City_{Destination}$ Therefore, HSVF=3

However, in the event of similar cities like Birmingham, Ala. and Birmingham in England, a further check needs to be done to find out the HSVF 591. This is done as follows

| Source | Destination |
| --- | --- |
| City: Birmingham | City: Birmingham |
| State: Alabama | State: West Midlands |
| Country: USA | Country: GBR |
| Continent: North America | Continent: Europe |

Had the comparison stopped at city, both locations would be considered the same. However, upon further inspection, the HSVF is calculated correctly to be 4

The algorithm would be expressed as follows

The figure below describes the process of calculating the HSVF

Figure 24:
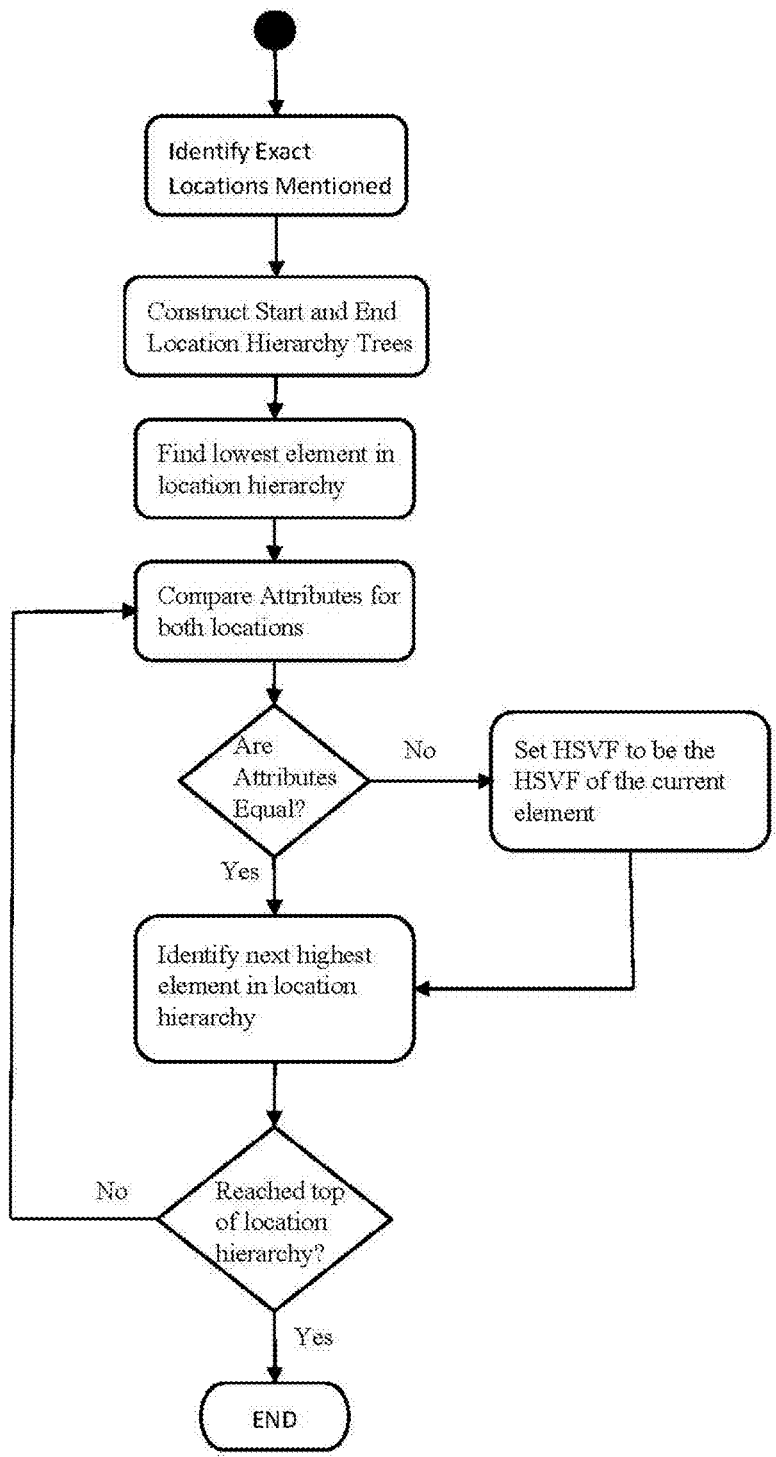
FIG. 24 is a diagram showing hierarchy decision tree.

Referring now to FIG. 24.

Time

Time taken to travel between two locations would be different for different means of transport.

Time takes precedence over cost when comparing different means of transport. But when the means of transport is similar, it is important to show the cheapest possible means (like cheapest flights). The comparisons would also be done based on the cheapest means of transport only.

If the user has a preference that the user wants to travel via the fastest or slowest means of transport, then the user is provided the details for that travel It is also important to consider not just the net travel time, but also the other times for the journey. For instance, if the user would like to travel in a flight, the time taken to reach the airport+the check-in time+the time taken to reach the destination location from the airport should also be considered.

a. For example,
b. A user can be an hour away from an airport and his travel time could be another hour. That combined with the optimal time the user is supposed to report in the airport would be another half an hour.
c. Then the travel time is not 1 hour. It is 2.5 hours in total.

Cost

Cost of travel would be usually the last element in the factors determining the travel type. The user can however, change that preference if need be.

The total cost of travel would consider most of the factors needed in travel.

If the difference between cost of travel by plane and cost of travel by road is high, then that response would also be mentioned.

Travel Variation Overhead (TVO) is calculated as the ratio of a particular travel criteria (such as cost, distance or time) of a MOT (such as road, flight, train etc.) to the lowest value of the travel criteria across all the available MOTs.

For example,

If cost of travel from Washington D.C. to Atlanta, Ga. by road==$400

The cost of travel from Washington D.C. to Atlanta, Ga. by flight==$1000

Flight Travel Variation Overhead $(TVO1_{cost})==500/200=2.5$

Road Travel Variation Overhead $(TVO2_{cost})==200/200=1$

Similar values can be calculated for distance and time.

The HSVF is given the highest priority followed by the TVO for different means of transport.

Based on the HSVF, the permissible TVO value may increase for a faster method of transport if the distance is similar or same between two locations in different modes of transport.

The Means Of Transportations (MOTs) have to be first identified.

Then the average TVO for each MOT is calculated as:

$$TVO_{Average}=(HSVF*TVO_{Distance}+TVO_{Cost}+TVO_{Time})/3 \qquad a.$$

The average TVOs are then compared and the MOT with the least average TVO is chosen. The best MOT has an average TVO of 1.

Example

Consider an example of traveling from Los Angeles to New York City where the Distance, Cost and Time of traveling by road and traveling by plane is given below:

Traveling By Road:
Total Distance=2791 miles
Cost=$600 (Including accommodation overnight)
Time=41 hours=2460 mins
Traveling by plane:
Total Distance=2791 miles Cost=$189+$40+$30=$259(flight cost+food+transit to airport)

Time=5.5+0 (non stop flight)+1.5+1=8 hours=480 mins(flight time+layover+wait time+travel to airport)

Calculations by Road:
Total Distance=2791 miles
HSVF=3

Cost(Assuming travel on road)=$600(Including accommodation overnight)

Time=41 hours=2460 mins $TVO_{Average}=(HSVF*TVO_{Distance}+TVO_{Cost}+TVO_{Time})/3$ $TVO_{Average}=(3*(2791/2791)+600/259+2460/480)/3$ $TVO_{Average}=(3+2.31+5.1)/3$ $TVO_{Average}=3.47$ Calculations by Plane:
Total Distance=2791 miles
HSVF=3

Cost=(flight cost+food+transit to airport)

Cost=$189+$40+$30=$259

Time=(flight time+layover+wait time+travel to airport)=5.5+0(non stop flight)+1.5+1=8 hours=480 mins $TVO_{Average}=(3*(2791/2791)+259/259+480/480)/3$ $TVO_{Average}=1.66$ Comparing average TVO value, the value for flights=1.66 where TVO value for road travel is 3.47

Therefore, the best possible travel solution would be by flight.

If the user specifies the mode of transport to be road, then a follow up question is asked by the assistant by mentioning the TVO variation that are in favour of the preferred travel.

TVO variations are as follows $\Delta TVO_{Time}=(Flight)TVO_{Time}-(Road)TVO_{Time}$ $\Delta TVO_{Time}=1-5.1$ $\Delta TVO_{Time}=-4.31$ $\Delta TVO_{Cost}=(Flight)TVO_{Cost}-(Road)TVO_{Cost}$ $\Delta TVO_{Cost}=1-2.31$ $\Delta TVO_{Cost}=-1.31$ The difference in TVO values would be identified to identify the type of response to the user.

This could be a follow up question or a recommendation or acknowledgement.

Response Generation

The response needs to be generated according to the type of transport chosen or determined. As explained before, the distance between two points determines the mode of transportation and that has to be mentioned in the response.

The response could be a follow up question in case of an ambiguity regarding the mode of transport or a statement made based on what the assistant has understood.

Consider the sentence: "I would like to travel from New York City to Los Angeles"
The inference after all the passes is as follow
Subject: "I" (User)
Verb: travel
Source: New York City
Destination: Los Angeles The natural language generation has to happen after the inference is done. Since New York City and Los Angeles are far apart, the distance between the locations should be considered and the mode of transport is identified to be air.

Air travel would include flights from New York City to Los Angeles. So the following action would be a confirmation of the mode of transport "Would you like to travel by flight from New York City to Los Angeles?"
Subject: you (User)
Verb: travel
Source: New York City
Destination: Los Angeles
Mode of Transportation: flight
User Preference and Follow Up Question The average TVO determines the most efficient MOT If the user has specified a preferred MOT, then the assistant would recommend a more efficient MOT if any.

When the most efficient MOT is identified and the user specified MOT is different from the most efficient MOT, then the response would be as follows "Traveling by flight would cost $259 and duration is about 8 hours. Would you like to travel by flight instead?"

If the user has not specified a preferred MOT, then the assistant would consider the most efficient MOT and perform the necessary action.

Figure 25:
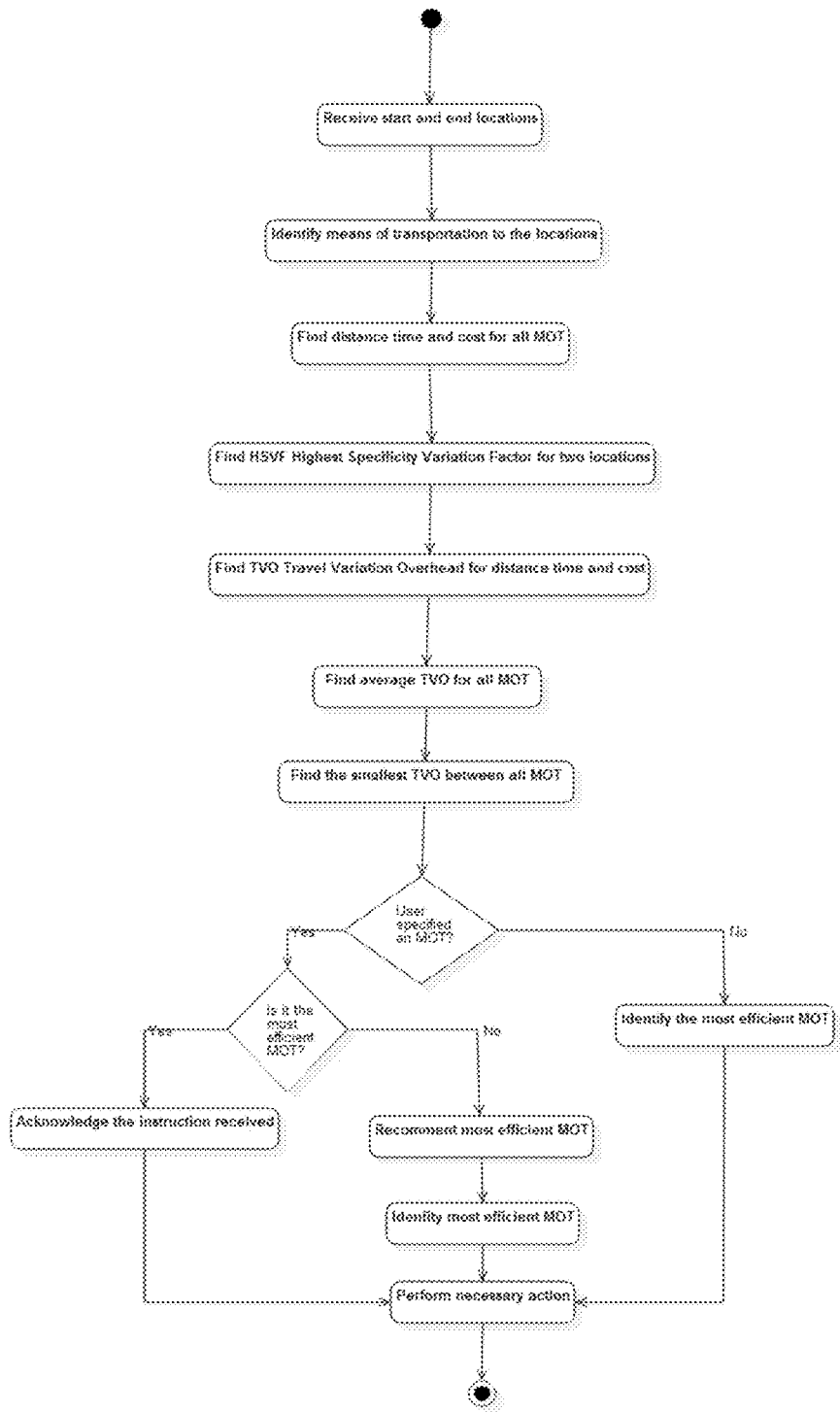
FIG. 25 is a diagram showing hierarchy decision tree.

The difference between the TVO values should be high enough to be considered to be a viable and more efficient MOT than the one preferred by the user to recommend a different MOT The concept is explained in the diagram as follows:
Referring now to FIG. 25.

Feature #4. INTELLIGENT ASSISTANT Interacting with the User, the Travel Backend and the UI A unique method of using NLP Techniques to:

Understand travel related commands from the user given in the form of natural language i.e. plain text input which is either spoken by the user or entered by the user by means of a keyboard.

Initiate a travel planning related conversation with the user prompting the user to enter travel selection criteria including start location, destination location, start date (and optionally a return date) Decipher other additional/optional parameters from the user input (e.g. preferred time, airline preference, no. of people traveling, no. of stopovers, preferred stopover location etc.) without prompting the user for such information and just automatically deriving these parameters from the user input.

Automatically guide the user for a more specific input (for location and date/time parameters only) assuming the user gives an abstract input (e.g. country, state. city instead of an expected airport, or week/month instead of a specific date of travel etc.)

Along with the 3D INTELLIGENT ASSISTANT (Personal Virtual Assistant) automatically:

Displaying the search parameter scorecard during the conversation and updating (i.e. adding parameters, editing parameters and deleting parameters).

Connecting with a Travel backend gateway with the travel search parameters and getting travel search results back along with engaging the user with a generated Natural Language response while awaiting for the results and doing so in a multi-threaded manner indicating the status updates from the backend gateway in real time.

Displaying the travel results on a GUI and summarizing them with behavioral states (e.g. "hey, I found a hundred flights) and highlighting the relevant ones as per the date/time/airlines/stopover preferences etc. by performing Gestures like page scroll, record sorting, record filtering, zooming into a specific record or switching between various screens (e.g. going to a previous flight search or swapping departure flight results with return flight results)

Optimizing the flight results by:
a. Sorting the flight results based on cost, total travel time, start time, stopover time etc.
b. Filtering the flight results based on airline preference etc.

Scrolling to a specific flight result and zooming into the details a specific flight that the user may be interested in.

Figure 26:
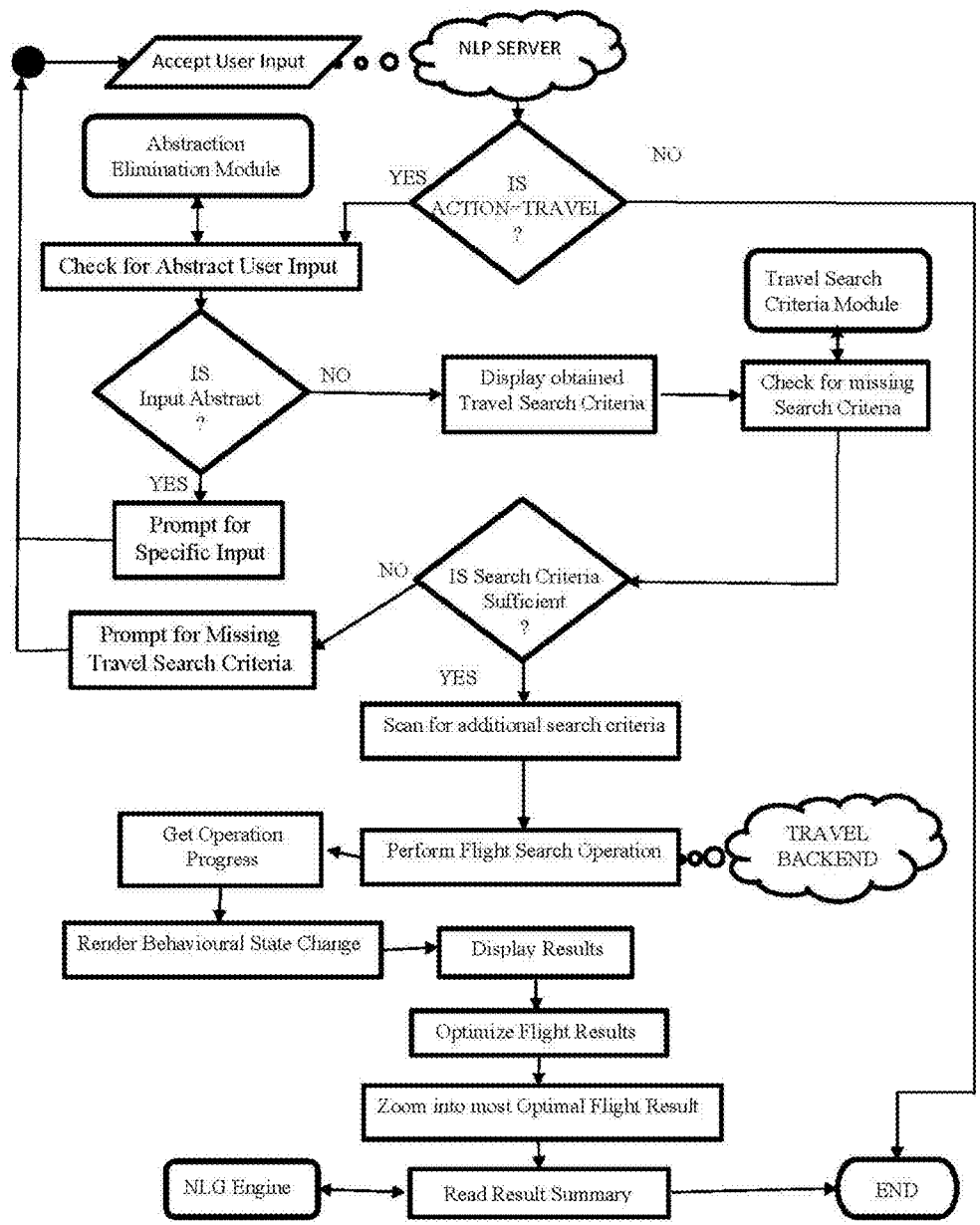
FIG. 26 is a diagram showing processing hierarchy decision tree.

The figure below describes the process followed for preparing a travel plan for the user based on the specified input Referring now to FIG. 26.

The User Input is sent to the NLP Server and if the user has provided a Travel Command eg. "I want a flight to New York", the NLP Server recognizes the TRAVEL Action.

The Abstraction Elimination Module then checks if the user has provided abstract input and if so, the INTELLIGENT ASSISTANT prompts the user for a more specific input. For example, for the Source Location the user is expected to provide at least the name of the City but if the user instead provides a Continent the INTELLIGENT ASSISTANT will render a confused Facial Expression and prompt the user to be more specific using a Natural Language text like, "You have specified a continent. I need the name of the city from which you will be traveling". Such English responses along with the facial expressions (dynamically computed based on the semantics of the situation) give the intelligent agent a human like personality of its own.

The provided Search Criteria are displayed for the user's reference. The user can review this and change the provided criteria (add/update/remove) if needed.

Once the user provides specific inputs, the Travel Search Criteria Module checks for any Missing Search Criteria. A user input like "I want a flight to Las Vegas" is missing the criteria "Start Location" and "Date/Time of Departure".

The INTELLIGENT ASSISTANT prompts the user in the form of a dialog (in Natural Language) the missing search criteria (if any). For example, assuming the user has provided the Start Location and Destination Location and hasn't provided the date/time criteria, the INTELLIGENT ASSISTANT will prompt the user "When would you like to travel?"

Once all the necessary Travel Search Criteria (Start Location, Destination Location and Departure Date/Time) are obtained from the user, the user's input is further scanned for additional parameters like Flight Preference, Time Preference, Cost Preference etc.

Finally, the Flight Search Operation is performed using a Travel Backend.

At regular intervals and upon receiving any updates from the Travel Backend regarding the progress of the Flight Search Operation, the INTELLIGENT ASSISTANT keeps the user engaged by reporting the progress of the operation with a corresponding change in the Behavioral State, the same expressed through Facial Expressions and Natural Language Output. For eg, assuming the search operation is taking a long time (eg. more than 30 seconds), the INTELLIGENT ASSISTANT's Behavioral State will change to Sad and the same will be expressed using an Sad Facial Expression a Natural Language Output like "I'm Sorry. It seems to be taking longer than usual."

Once the Flight Search Results are obtained, the INTELLIGENT ASSISTANT Optimizes the results by Sorting them based on the cost, total travel time, start time, stopover time etc. and then filtering based on airline preference etc.

Once the INTELLIGENT ASSISTANT has located the most optimal Flight Result based on what the user may be interested in, the INTELLIGENT ASSISTANT scrolls to the result (if needed) and then zooms in on it by displaying all the relevant details of the Flight Result and also summarizes the important details using the Natural Language Generator and then conveys the user this summarized information through text and voice output.

Example

If the user enters "I want a flight to New York"

Figure 27:
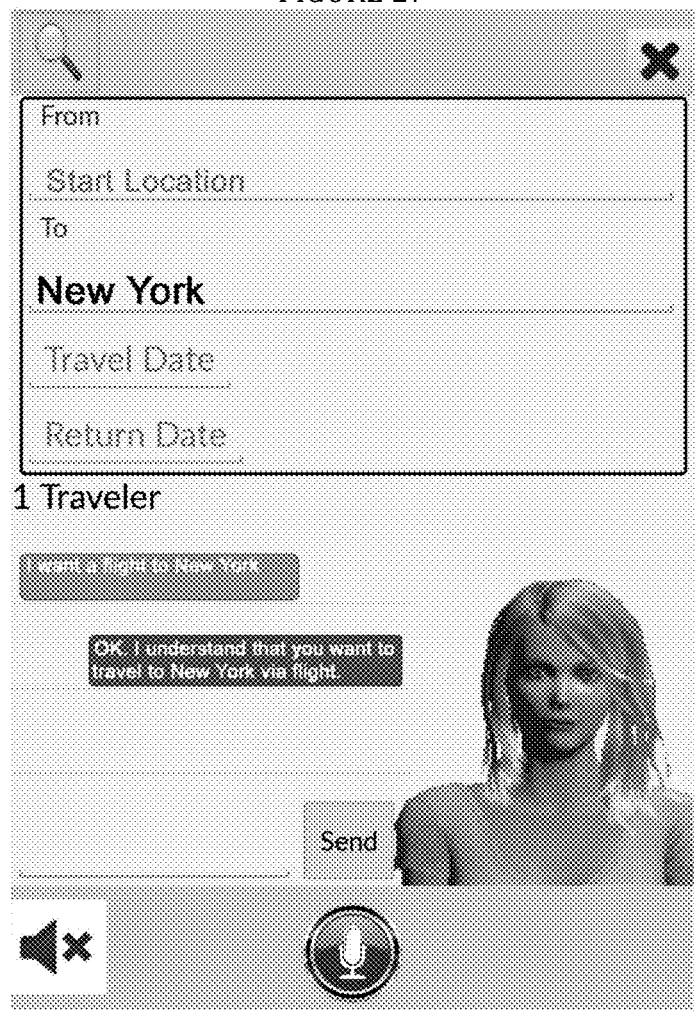
FIG. 27 is an illustrative representation of mobile device screen shot.

The Travel Backend recognizes the Travel ACTION, initiates the Travel Planning, confirms the initiated Travel ACTION by initiating a conversation with the user and displays the provided Search Criteria as shown in the figure below:
a. # of Figure
b. The figure below shows the user initiating a Travel ACTION by means of spoken text and the intelligent agent confirming that it understood the user.
c. See FIG. 27

The Abstraction Elimination Module then checks if the user has provided abstract input. In this case the user has provided the Destination City Name which is specific enough to base the search on.

Figure 28:
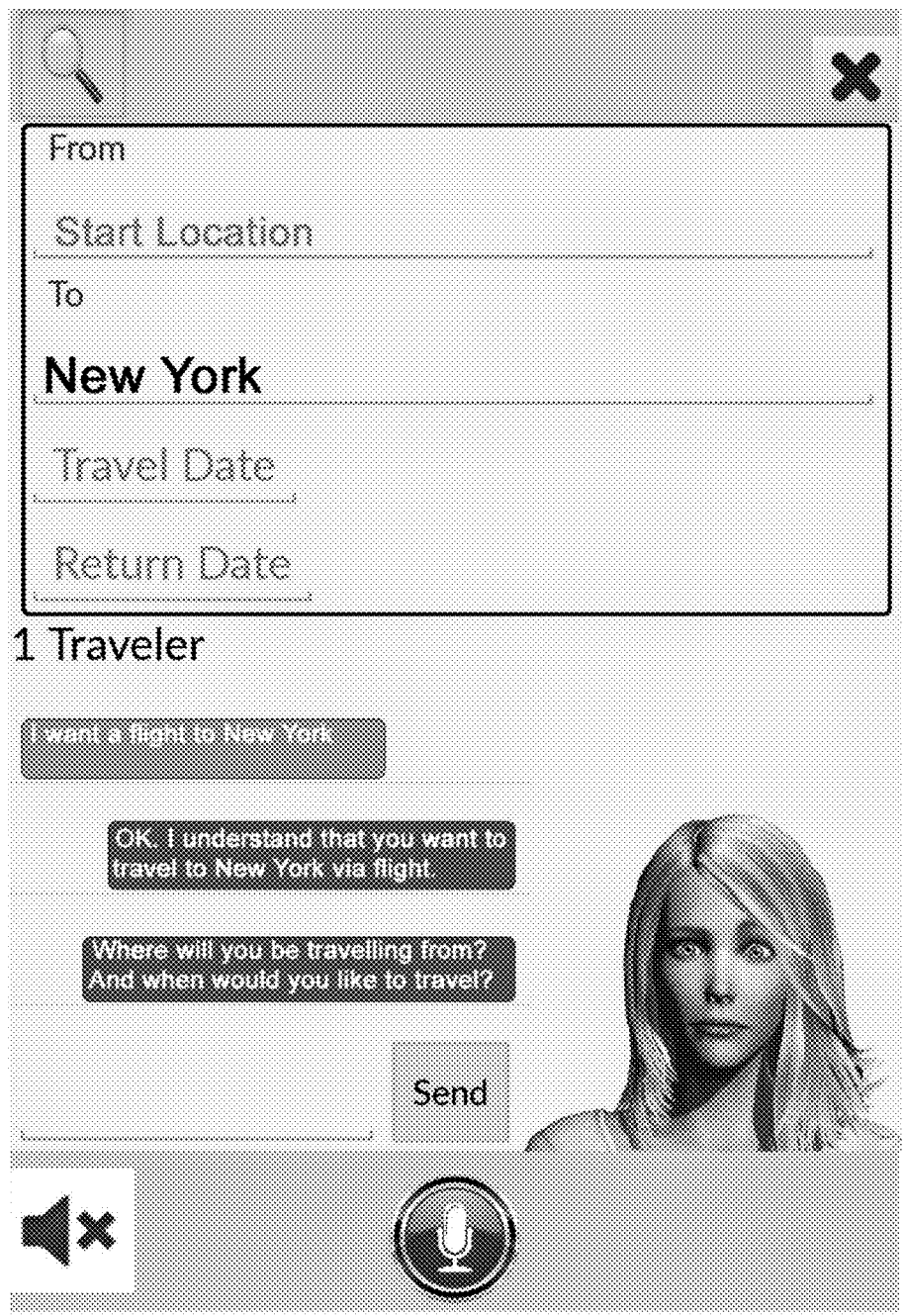
FIG. 28 is an illustrative representation of mobile device screen shot.

The Travel Search Criteria Module then checks for missing input and finds that the user hasn't provided the Start Location and Date/Time parameter this triggers a CONFUSED Behavioral State i.e. the Intelligent Agent is confused because of incomplete parameters and equally curious to see what the user is going to say next and hence the INTELLIGENT ASSISTANT prompts the user for the missing input by rendering a CONFUSED Facial Expression and using a Natural Language text like, "Where will you be traveling from? And when would you like to travel?". This is shown in the figure below:
XX
a. # of Figure
b. The figure below shows the CONFUSED Facial Expression being rendered and the Natural Language Text as a result of the user not having provided the Start Location and the Start Date.
c. See FIG. 28

Figure 29:
FIG. 29 is an illustrative representation of mobile device screen shot.

If the user provides an abstract location for the destination, "I'll be traveling from North America." A SURPRISED Behavioral State is triggered i.e. the Intelligent Agent is Surprised that the user has provided a Continent instead of a city or an airport and this is reflected through a SURPRISED facial expression and a Natural Language text "North America is a continent. I need a specific city or airport from where you'll be traveling from." This is shown in the image below:
a. # of Figure
b. The figure below shows the SURPRISED Facial Expression being rendered along with the Natural Language text as a result of the user providing an abstract input for the Start Location (as Continent).
c. See FIG. 29
d.

Figure 30:
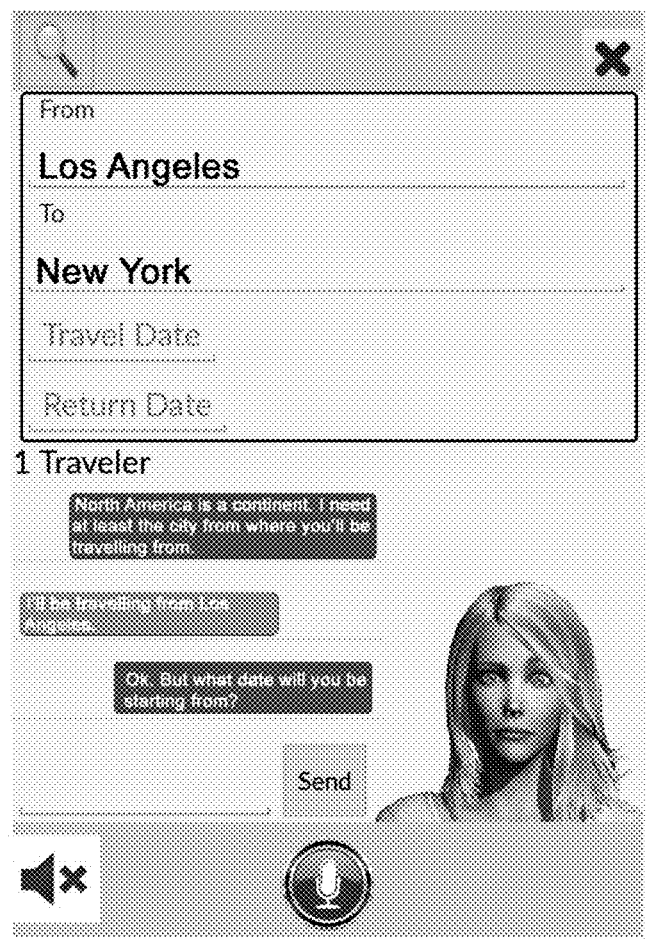
FIG. 30 is an illustrative representation of mobile device screen shot.

The user then provides the city name as Los Angeles. At this step, the Travel Search Criteria Module finds that the Date/Time Parameter is still not given and hence prompts the user to provide the date/time parameter, again with a confused Behavioral State conveyed using a Confused Facial Expression and a Natural Language text "Ok. But what date will you be starting from?" Such English responses along with the facial expressions (dynamically computed based on the semantics of the situation) give the intelligent agent a human like personality of its own. This is shown in the image below:
  a. # of Figure
  b. The figure below shows the CONFUSED Facial Expression rendered again as the user still hasn't provided the Start Date.
  c. See FIG. 30

Figure 31:
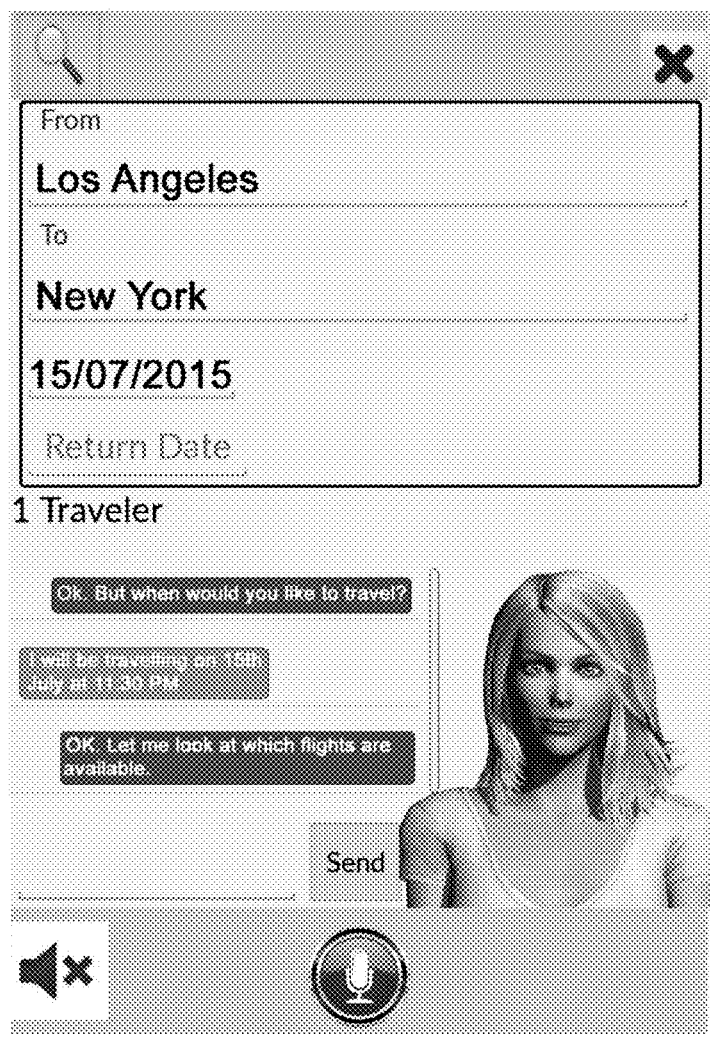
FIG. 31 is an illustrative representation of mobile device screen shot.

If the user says, "I will be traveling on 15 July at 11:30 PM". Although the time was not asked by the agent, it is able to understand that the user wants to depart at a specific time on that day (and not just any time during that day). The INTELLIGENT AGENT then uses all this information to perform a Flight Search Operation using the Travel Backend. This is shown in the image below:
  a. # of Figure
  b. The figure below shows the Intelligent Agent telling the user that it has obtained all the parameters necessary from the user and is now going to perform the requested Flight Search Operation.
  c. See FIG. 31

Figure 32:
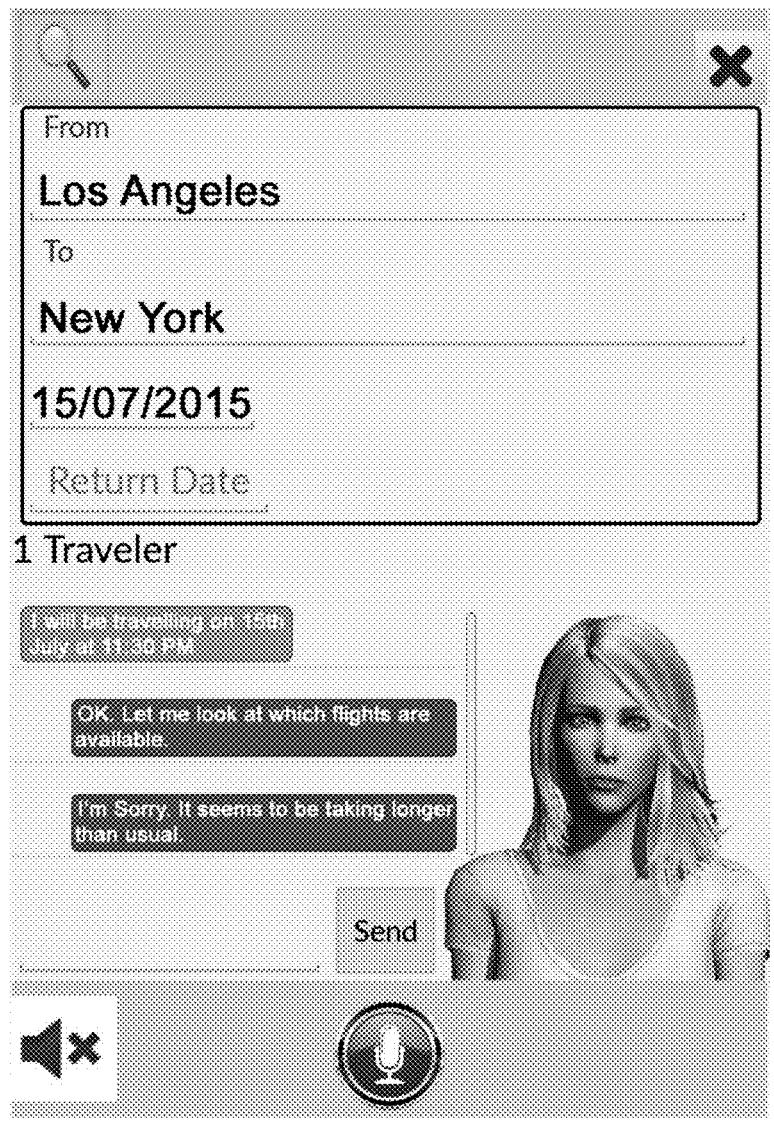
FIG. 32 is an illustrative representation of mobile device screen shot.

Assuming that the Flight Search Operation is taking a long time (eg. more than 30 seconds) the Behavioral State of the INTELLIGENT AGENT is changed to sad and the same is expressed using a Sad Facial Expression along with a Natural Language text, "I'm Sorry. It seems to be taking longer than usual." This is shown in the figure below:
  a. # of Figure
  b. The figure shows the Intelligent Agent keeping the user engaged by means of Facial Expressions and Natural Language text while the request Flight Search Operation is being performed.
  c. See FIG. 32.

Figure 33:
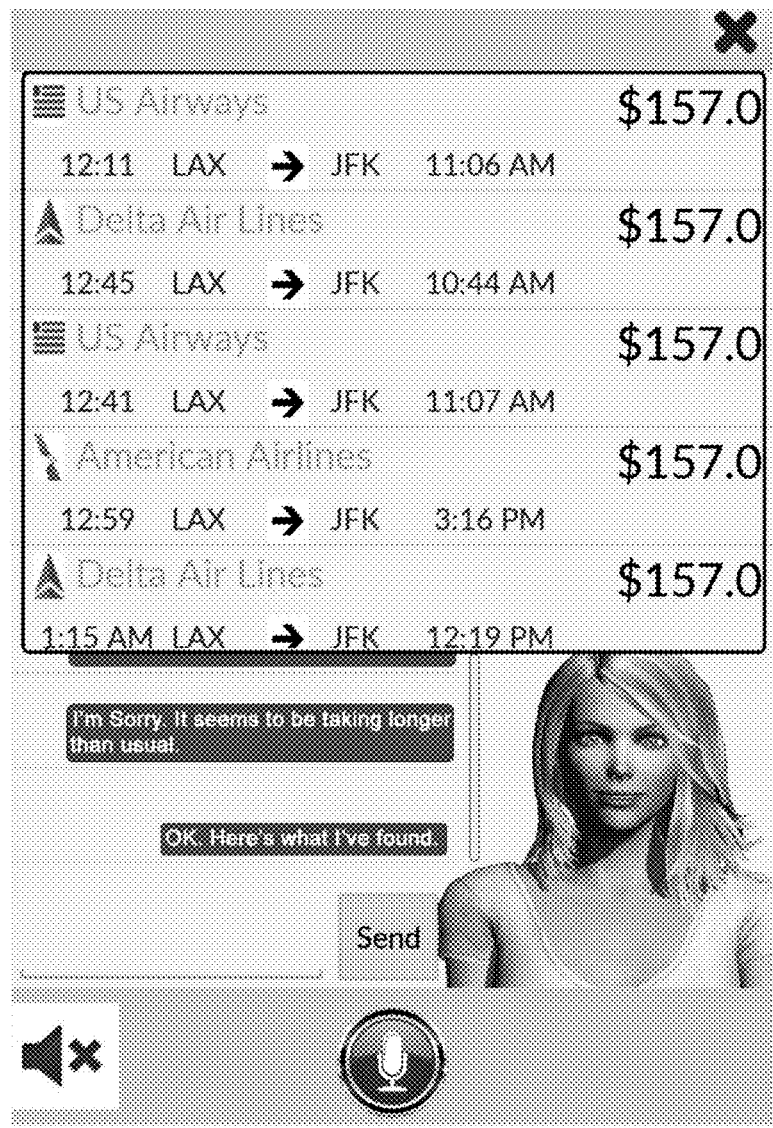
FIG. 33 is an illustrative representation of mobile device screen shot.

Once the Flight Search Results are obtained, they are displayed to the user as shown in the figure below:
  a. # of Figure
  b. The figure below shows the Flight Results obtained as a result of the user's Flight Search Criteria.
  c. See FIG. 33

Figure 34:
FIG. 34 is an illustrative representation of mobile device screen shot.

Now if the user says "Can you get me the cheapest flight?" the Agent will understand that the superlative of the adjective "cheap" relates to the cost attribute of the flight and hence the sorting must be done based on the ascending order of flight cost. If the user mentioned "costliest" or most expensive then it would still be related to the cost attribute but it would sorted based on descending order. The same can be done with regards to other attributes e.g. departure time, the user may say "get me the earliest flight" or "get me the latest flight" or if the user prefers the next available flight he might say "get me the most immediate flight" or for e.g. duration, the user may say "get me the shortest flight". The Intelligent Agent can then perform Gestures like page scroll, record sorting, record filtering, zooming into a specific record or switching between various screens (e.g. going to a previous flight search or swapping departure flight results with return flight results).
  a. # of Figure
  b. The example figure below shows the case where the user says, "Get me the shortest flight" wherein the INTELLIGENT AGENT zooms in on the $2^{nd}$ result (which has a total flight duration of 06 h:59 m) by using a pinch-zoom gesture.
  c. See FIG. 34

Figure 35:
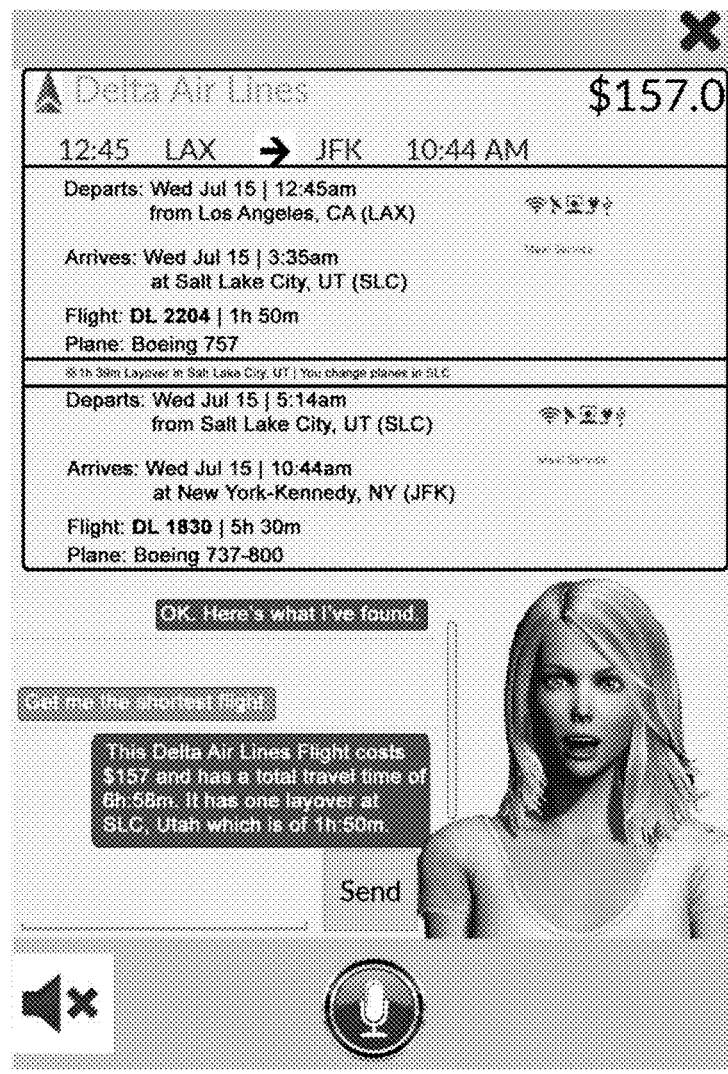
FIG. 35 is an illustrative representation of mobile device screen shot.

The INTELLIGENT AGENT then displays the details of this Flight Result along with using the NLG Engine to summarize the details in the form of Natural Language and read it out to the user by saying: "This Delta Air Lines Flight costs $157 and has a total travel time of 6 h:58 m. It has one layover at SLC, Utah which is of 1 h:50 m." This is shown in the image below:
  a. # of Figure
  b. The figure below shows the Intelligent Agent reading out the summary of the Flight Result chosen by the user.
  c. See FIG. 35

The invention claimed is:

1. A portable electronic device having a travel-related entity and actions in communication with remote computing equipment over a communications path, comprising:
  one or more input devices;
  one or more output devices;
  one or more processors; and
  memory storing one or more programs configured to be executed by the one or more processors, the one or more programs including instructions for:
  providing an Intelligent Interactive Travel Agent as a graphic animation to a user, said Intelligent Interactive Travel Agent having modules for receiving and processing verbal commands from the user; wherein the Intelligent Interactive Travel Agent operates a Graphical User Interface (GUI) from the verbal commands; wherein the intelligent interactive travel agent executes GUI operations comprising tapping, swiping, pinching, searching for text, entering text, and displaying retrieved content, in one or more mobile electronic display notes displayed in a container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user, said human-like animation comprises matched human-like characteristics, said characteristics comprising a human-like facial proportions, a human-like appearance, a human-like voice, and human-like gestures; and
  in response to travel-related user input in a messaging application, processing content of the travel-related user input, said processing content comprising at least in part Natural Language Processing/Understanding (NLP/NLU), and providing travel-related feedback to the user:
  wherein the travel-related feedback comprises a graphical or spoken output from the portable electronic device, said output programmed to represent knowledge in a Cognitive Model using Semantic Actions and Entities/Concepts and their inter-relationships, said output programmed to express travel-related knowledge by generating English responses using Natural Language Generation (NLG), aid output programmed to maintain behavioral states and feelings in a computational manner as a result of circumstantial triggers, user behavior and productivity of Interactive Intelligent Travel Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory;

said output comprising an offer to provide travel-related information, an offer to provide travel-related actions, an offer to send a travel-related communication, or an offer to save travel-related information, wherein processing content of the user input comprises analyzing message content to collect travel-related parameters relating to geographic travel path, airport information, air travel route information, airline flight information, flight availability, flight status, flight booking information, flight cancelling information, airport fees, baggage fees, local and remote ground transportation options, local and remote weather information, message priority, channel type, channel availability, user schedule, user time zone, user time and date, user travel-related preferences, type of content, and number of recipients, and saving said collected parameters to memory;

wherein the travel-related parameter is calculated using a travel-related index, the travel-related index comprising a numerical value based on travel-related hierarchy;

wherein the one or more programs include instructions for providing feedback to the user wherein the feedback comprises a graphical or spoken output from the portable electronic device, said output comprising information linked to the user schedule and one or more travel-related parameters, wherein the user schedule parameter is compared to a travel-related parameter and a scheduling database is populated with an entry that uses the comparison data; and, wherein specific customized travel-related profile parameters are set to establish priority overrides where a user schedule has a different priority than a travel-related parameter.

2. The portable electronic device of claim 1, further comprising wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory.

3. The portable electronic device of claim 1, further comprising wherein the one or more programs include instructions for providing feedback to the user wherein the feedback comprises a graphical or spoken output from the portable electronic device, said output comprising a series of selectable options for modifying the initial user input.

4. The portable electronic device of claim 1, further comprising wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service.

5. The portable electronic device of claim 1, further comprising wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

6. The portable electronic device of claim 1, further comprising wherein the one or more programs include instructions for providing feedback to the user wherein the feedback comprises a graphical or spoken output from the portable electronic device, said output comprising an automated re-transcription of content with said user input based on said relationship hierarchy.

7. A method of providing a contextual linking application having an animated interactive intelligent travel agent for managing communications with contacts in a portable mobile electronic device, comprising the steps:

in a mobile electronic device having one or more processors, and memory storing one or more programs configured to be executed by the one or more processors, executing one or more programs including instructions for providing an Intelligent Interactive Travel Agent as a graphic animation to a user, said Intelligent Interactive Travel Agent having modules for receiving and processing travel-related verbal commands from the user; wherein the Intelligent Interactive Travel Agent operates a Graphical User Interface (GUI) from the travel-related verbal commands; wherein the intelligent interactive travel agent executes GUI operations comprising tapping, swiping, pinching, searching for text, entering text, and displaying retrieved content, in the one or more mobile electronic display notes displayed in the container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the travel-related verbal commands from the user, said human-like animation comprises matched human-like characteristics, said characteristics comprising a human-like facial proportions, a human-like appearance, a human-like voice, and human-like gestures; and in response to travel-related user input in a messaging application, processing content of the user input, said processing content comprising at least in part Natural Language Processing/Understanding (NLP/NLU), and providing travel-related feedback to the user;

wherein the travel-related feedback comprises a graphical or spoken output from the portable electronic device, said output programmed to represent knowledge in a Cognitive Model using Semantic Actions and Entities/Concepts and their inter-relationships, said output programmed to express knowledge by generating English responses using Natural Language Generation (NLG), aid output programmed to maintain behavioral states and feelings in a computational manner as a result of circumstantial triggers, user behavior and productivity of Interactive Intelligent Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory; said output comprising an offer to provide travel-related information, an offer to provide travel-related actions, an offer to send a travel-related communication, or an offer to save travel-related information;

processing travel-related parameters relating to geographic travel path, airport information, air travel route information, airline flight information, flight availability, flight status, flight booking information, flight cancelling information, airport fees, baggage fees, local and remote ground transportation options, local and remote weather information, message priority, channel type, channel availability, user schedule, user time zone, user time and date, user travel-related preferences, type of content, and number of recipients, and saving said collected parameters to memory;

wherein the travel-related parameter is calculated using a travel-related index, the travel-related index comprising a numerical value based on travel-related hierarchy;

wherein the one or more programs include instructions for providing feedback to the user wherein the feedback comprises a graphical or spoken output from the portable electronic device, said output comprising information linked to the user schedule and one or more travel-related parameters, wherein the user schedule parameter is compared to a travel-related parameter and a scheduling database is populated with an entry that uses the comparison data; and, wherein specific customized travel-related profile parameters are set to establish priority overrides where a user schedule has a different priority than a travel-related parameter;

wherein the one or more programs include instructions for accepting ambiguous user input relating to a name of a person in a contacts database stored in memory, resolving the ambiguous user input using language processing patterns stored in memory, area code, city and state of address, IP address, type of device, device vendor, device electronic identity number, network or domain membership, type of domain, encryption status, carrier identity, and type of cellular network 3G-4G-LTE, and providing feedback to the user wherein the feedback comprises a graphical or spoken output from the portable electronic device, said output comprising a selectable list of one or more contacts stored in memory.

8. The method of claim 7, further comprising the step wherein the one or more programs include instructions for providing feedback to the user wherein the feedback comprises a graphical or spoken output from the portable electronic device, said output comprising a series of selectable options for modifying the initial user input.

9. The method of claim 7, further comprising the step wherein the one or more programs include instructions for providing feedback to the user wherein the feedback comprises a graphical or spoken output from the portable electronic device, said output comprising a navigation solution and display map, which is saved to memory, and is linked to the user input, wherein the instructions are defined in a navigation resolution module that scans the user input for destination location, source location, transportation modes, and routing information, wherein the navigation resolution module compares the scanned user input results against location information, said location information obtained from one or more sources comprising a contact database, a GPS output, a WiFi location identifier, wherein an initial navigation set is generated from said comparison, the navigation set is then processed using an address validation module to connect to an external address validation service.

10. The method of claim 7, further comprising the step wherein the one or more programs include instructions for providing feedback to the user wherein the feedback comprises a graphical or spoken output from the portable electronic device, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

11. The method of claim 7, further comprising the step wherein the one or more programs include instructions for providing feedback to the user wherein the feedback comprises a graphical or spoken output from the portable electronic device, said output comprising an automated re-transcription of content with said user input based on said relationship hierarchy.

12. A non-transitory computer-readable storage medium comprising instructions that, when executed by a processor, cause the processor to:

provide providing an Intelligent Interactive Travel Agent as a graphic animation to a user, said Intelligent Interactive Travel Agent having modules for receiving and processing verbal commands from the user; wherein the Intelligent Interactive Travel Agent operates a Graphical User Interface (GUI) from the verbal commands; wherein the intelligent interactive travel agent executes GUI operations comprising tapping, swiping, pinching, searching for text, entering text, and displaying retrieved content, in one or more mobile electronic display notes displayed in a container display matrix; wherein the graphic animation is rendered to project a tapping gesture as part of the tapping operation; wherein the graphic animation is rendered to project a swiping gesture as part of the swiping operation; wherein the graphic animation is rendered to project a pinching gesture as part of the pinching operation; wherein the graphic animation is rendered to project a searching gesture as part of the searching operation; wherein the graphic animation is rendered to project a text entry gesture as part of the text entry operation; wherein the graphic animation is rendered to project a content displaying gesture as part of the content displaying operation; wherein the graphic animation is rendered to project a human-like animation as an output responsive to the verbal commands from the user, said human-like animation comprises matched human-like characteristics, said characteristics comprising a human-like facial proportions, a human-like appearance, a human-like voice, and human-like gestures; and in response to travel-related user input in a messaging application, processing content of the travel-related user input, said processing content comprising at least in part Natural Language Processing/Understanding (NLP/NLU), and providing travel-related feedback to the user:

wherein the travel-related feedback comprises a graphical or spoken output from the portable electronic device, said output programmed to represent knowledge in a Cognitive Model using Semantic Actions and Entities/Concepts and their inter-relationships, said output programmed to express travel-related knowledge by generating English responses using Natural Language Generation (NLG), aid output programmed to maintain behavioral states and feelings in a computational manner as a result of circumstantial triggers, user behavior and productivity of Interactive Intelligent Travel Agent by means of a Psychology Engine, said output programmed to express the behavioral states and feelings using facial Expressions rendered in a the human-like animation, said output programmed to have Conversations/Dialogs in a taking-turns dialogue manner, said output programmed to remember context of the Conversations/Dialogs in a Contextual Memory;

said output comprising an offer to provide travel-related information, an offer to provide travel-related actions, an offer to send a travel-related communication, or an offer to save travel-related information, wherein processing content of the user input comprises analyzing message content to collect travel-related parameters relating to geographic travel path, airport information, air travel route information, airline flight information, flight availability, flight status, flight booking information, flight cancelling information, airport fees, baggage fees, local and remote ground transportation options, local and remote weather information, message priority, channel type, channel availability, user schedule, user time zone, user time and date, user travel-related preferences, type of content, and number of recipients, and saving said collected parameters to memory;

wherein the travel-related parameter is calculated using a travel-related index, the travel-related index comprising a numerical value based on travel-related hierarchy;

wherein the one or more programs include instructions for providing feedback to the user wherein the feedback comprises a graphical or spoken output from the portable electronic device, said output comprising information linked to the user schedule and one or more travel-related parameters, wherein the user schedule parameter is compared to a travel-related parameter and a scheduling database is populated with an entry that uses the comparison data; and, wherein specific customized travel-related profile parameters are set to establish priority overrides where a user schedule has a different priority than a travel-related parameter.

* * * * *